(12) United States Patent
Barocio et al.

(10) Patent No.: US 11,926,093 B2
(45) Date of Patent: Mar. 12, 2024

(54) METHODS AND APPARATUS FOR EMBEDDING HEATING CIRCUITS INTO ARTICLES MADE BY ADDITIVE MANUFACTURING AND ARTICLES MADE THEREFROM

(71) Applicant: Purdue Research Foundation, West Lafayette, IN (US)

(72) Inventors: Eduardo Barocio, West Lafayette, IN (US); Robert Byron Pipes, Lafayette, IN (US); Bastian Brenken, West Lafayette, IN (US); Anthony Jordan Favaloro, West Lafayette, IN (US); Nicholas Mario DeNardo, Bridgeville, PA (US)

(73) Assignee: Purdue Research Foundation, West Lafayette, IN (US)

( * ) Notice: Subject to any disclaimer, the term of this patent is extended or adjusted under 35 U.S.C. 154(b) by 429 days.

(21) Appl. No.: 17/145,370

(22) Filed: Jan. 10, 2021

(65) Prior Publication Data
US 2021/0129431 A1    May 6, 2021

Related U.S. Application Data

(62) Division of application No. 15/938,597, filed on Mar. 28, 2018, now Pat. No. 10,889,056.
(Continued)

(51) Int. Cl.
*B29C 64/165* (2017.01)
*B29C 33/06* (2006.01)
(Continued)

(52) U.S. Cl.
CPC ............ *B29C 64/165* (2017.08); *B29C 33/06* (2013.01); *B29C 33/3842* (2013.01);
(Continued)

(58) Field of Classification Search
CPC ... B29C 64/165; B29C 64/118; B29C 64/295; B29C 33/06; B29C 33/3842
See application file for complete search history.

(56) References Cited

U.S. PATENT DOCUMENTS 10,254,499 B1 *   4/2019   Cohen ............... B33Y 70/10
10,857,730 B1 * 12/2020   Cohen ............ B29C 48/0022
2018/0070453 A1 *  3/2018  Espalin ............. H05K 3/103

* cited by examiner

*Primary Examiner* — Nahida Sultana
*Assistant Examiner* — Mohamed K Ahmed Ali
(74) *Attorney, Agent, or Firm* — Purdue Research Foundation

(57) ABSTRACT

Methods of embedding a heating circuit in an article fabricated by additive manufacturing. The methods describe techniques such as co-extruding a wire, capable of being heated, along with print material in additive manufacturing of the article, and placing a pre-shaped wire capable of being heated between adjacent layers of the article. A third method includes dispensing a wire, capable of being heated, during the additive manufacturing of the article, and compacting the wire into the printed material. An apparatus for embedding a heating circuit in an article fabricated by additive manufacturing. The apparatus contains a wire dispenser, a cutter to control the length of the wire dispensed, and a compactor capable of embedding the wire capable of being heated into the printed material. An article made by additive manufacturing is disclosed. The article contains at least one heating element embedded in the article during the additive manufacturing process.

10 Claims, 22 Drawing Sheets

Related U.S. Application Data

(60) Provisional application No. 62/480,110, filed on Mar. 31, 2017.

(51) Int. Cl.
    *B29C 33/38*         (2006.01)
    *B29C 64/118*      (2017.01)
    *B29C 64/209*      (2017.01)
    *B29C 64/295*      (2017.01)
    *B29C 70/38*        (2006.01)
    *B33Y 30/00*        (2015.01)
    B29K 81/00        (2006.01)
    B29K 705/08      (2006.01)
    B29L 31/00        (2006.01)
    B33Y 10/00        (2015.01)
    B33Y 80/00        (2015.01)

(52) U.S. Cl.
CPC .......... *B29C 64/118* (2017.08); *B29C 64/295* (2017.08); *B29C 70/38* (2013.01); *B33Y 30/00* (2014.12); *B29C 64/209* (2017.08); *B29K 2081/04* (2013.01); *B29K 2705/08* (2013.01); *B29L 2031/757* (2013.01); *B33Y 10/00* (2014.12); *B33Y 80/00* (2014.12)

METHODS AND APPARATUS FOR EMBEDDING HEATING CIRCUITS INTO ARTICLES MADE BY ADDITIVE MANUFACTURING AND ARTICLES MADE THEREFROM

CROSS-REFERENCE TO RELATED APPLICATIONS

The present U.S. patent application is a divisional of U.S. patent application Ser. No. 15/938,597 filed Mar. 28, 2018, which is related to and claims the priority benefit of U.S. Provisional Patent Application Ser. No. 62/480,110 filed Mar. 31, 2017, the contents of which are hereby incorporated by reference in their entirety into the present disclosure.

STATEMENT REGARDING GOVERNMENT FUNDING

This invention was made with government support under DE-EE0006926 awarded by the Department of Energy. The government has certain rights in the invention.

TECHNICAL FIELD

This disclosure relates to additive manufacturing methods and apparatus and especially to methods and apparatus for fabricating tools requiring temperature control.

BACKGROUND

This section introduces aspects that may help facilitate a better understanding of the disclosure. Accordingly, these statements are to be read in this light and are not to be understood as admissions about what is or is not prior art.

During the last decade Additive Manufacturing (AM) technologies have transitioned from being prototyping tools to become manufacturing techniques for producing end-use parts. In this disclosure the phrase "additive manufacturing" and the word "printing" are used interchangeably. Further, in the context of this disclosure, the word tool is to be understood as an object produced by additive manufacturing for the purpose of being used as a mold or part of the tooling required to make a desired physical component. For example, a mold can be produced by AM using the printing process of depositing material and in the context of this disclosure such a, mold will be called a printed tool or printed tooling. Accordingly, in this disclosure, the words tool, tooling and mold are used interchangeably to denote the object printed by AM using the methods and apparatus of this disclosure. Extrusion Deposition Additive Manufacturing (EDAM), an AM technology for polymeric materials, has enabled the production of short runs of intricate shapes with lower cost, lower waste of material and at higher rates than traditional subtractive methods.

Feedstock materials conventionally used in EDAM namely Acrylonitrile Butadiene Styrene (ABS) and Polylactic Acid (PLA) lack of mechanical properties required in end-use parts. Such limitations have fostered the adoption of reinforced polymers for printing. Recent research has focused on 3D printing with high temperature reinforced thermoplastics like Polyphenylene Sulfide (PPS) reinforced with up to 50% of long-discontinuous carbon fiber. One of the current applications for printing with composite materials is for producing tooling or molds for the composite industry. Printed tools require low Coefficient of Thermal Expansion (CTE), thermal stability (low shape distortion at temperatures up to 180° C.) and vacuum integrity. In addition to these features, traditional metal tools are frequently equipped with heating elements to assist the curing process of the molded part. Curing temperatures can vary from 80° C. up to 180° C. depending on the resin system used. In order to achieve these temperatures, conventional aluminum or steel tools incorporate cartridge heaters, mat heaters, or use heat transfer fluids for heating the tools. Nevertheless, these technologies are not suitable for printed tools that need to operate at temperatures up to 180° C. due to the low thermal conductivity and low glass transition temperature that is characteristic of polymers. One issue that would arise of heating a printed mold with traditional heating technologies is for example: cartridge heaters impose a constant heat flux (heat flow per unit area) on the surface of the heating element which combined with the low thermal conductivity of the polymer introduce large temperature gradients around the heater. Temperature gradients can be sufficiently high to melt the material nearby the heating element which could result in tool shape distortions.

Thus there exists an unmet need for methods and apparatus for additive manufacturing of tools or molds capable of operating at temperatures up to and exceeding 180° C. without undesirable thermal gradients across the printed tool. Further, there is a need for methods and apparatus for additive manufacturing of articles which may be deployed in applications requiring temperature control of the article.

SUMMARY

A method of embedding a heating circuit in an article fabricated by additive manufacturing is disclosed. The method includes co-extruding a wire along with print material utilized in additive manufacturing of the article, wherein the wire is capable of being heated when the article is used in an intended application.

Another method of embedding a heating circuit in an article fabricated by additive manufacturing is disclosed. The method includes placing a pre-shaped wire between at least two adjacent layers printed with additive manufacturing material utilized in additive manufacturing of the article, wherein the pre-shaped wire is capable of being heated when the article is used in an intended application.

A method of embedding a heating circuit in an article fabricated by additive manufacturing is disclosed. The method includes dispensing a wire in a predefined fashion during the additive manufacturing into material printed to make an article such that the wire is capable of being heated when the article is used in an intended application, heating the wire while being dispensed, compacting the wire into the printed material, and cutting the wire to a desired length.

An apparatus for embedding a heating circuit in an article fabricated by additive manufacturing is disclosed. The apparatus contains a wire dispenser capable of dispensing a wire in a predefined fashion during the additive manufacturing into material being printed to make an article such that the wire is capable of being heated, a heating system capable of heating the wire while being dispensed, a cutter capable of cutting the wire to a desired length, and a compactor capable of consolidating and embedding the wire into the printed material.

An article made by additive manufacturing is disclosed. The article contains a heating circuit or heating element embedded in the article during the additive manufacturing process.

BRIEF DESCRIPTION OF DRAWINGS

Some of the figures shown herein may include dimensions. Further, some of the figures shown herein may have been created from scaled drawings or from photographs that are scalable. It is understood that such dimensions or the relative scaling within a figure are by way of example, and not to be construed as limiting.

DETAILED DESCRIPTION

Figure 1:
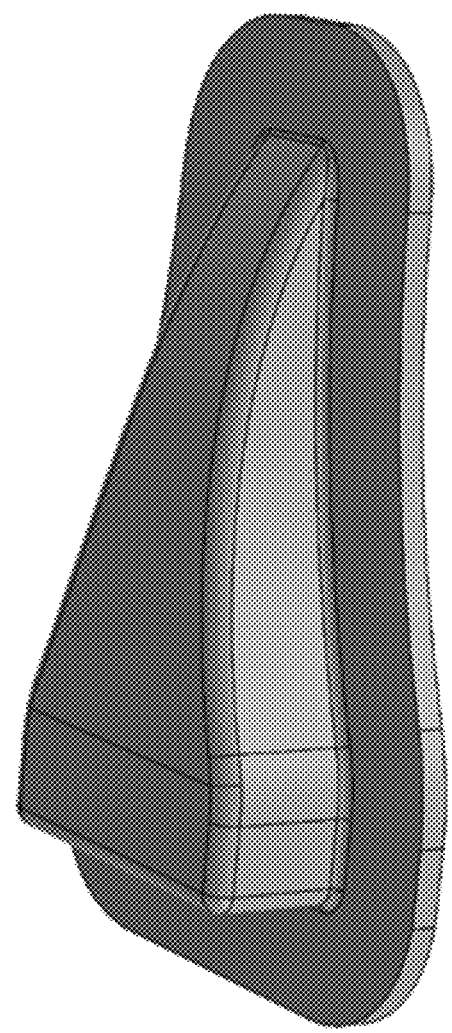
FIG. 1 is an example of a CAD geometry of a one-sided mold that can be fabricated by additive manufacturing.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended.

During the last twenty years, Additive Manufacturing (AM) techniques have evolved from rapid prototyping methods to a potential manufacturing method for in-service parts and tooling. Extrusion Deposition Additive Manufacturing (EDAM) is one of the most matured and commonly used techniques. In this extrusion based process, feedstock material in pellet form is molten and deposited on a printing bed. By following a predefined machine path, the printer controls the history of deposition, and a part is built layer by layer. A reinforcing material such as discontinuous carbon fiber can be utilized by changing the feedstock. By combining carbon fiber with high temperature thermoplastics such as PPS (Polyphenylene Sulfide) or PEI (Polyethylenimine), the thermomechanical properties required by high-temperature tooling are achieved. Additionally, the progressive buildup of structure allows for novel heating element insertion not available in traditionally tooling methods.

As mentioned earlier, there exists an unmet need for methods an apparatus for printing tools utilizing additive manufacturing that are capable of operating at temperatures up to and in excess of 180° C. without undesirable thermal gradients across the printed tool.

While this detailed description utilizes a mold produced by additive manufacturing to illustrate the principles, and methods and apparatus of this disclosure, it should be recognized that the aspects of this disclosure apply in general to any article manufactured by additive manufacturing techniques. Thus it should be recognized that the uses of a mold in this disclosure is for illustrative purposes.

This disclosure addresses these limitations by introducing a continuous heating wire throughout the printing process. By placing heating circuits near the tool surface and by shortening the distance between adjacent wires within the circuit, temperature gradients on the tool surface are significantly reduced. Furthermore, heating circuits can be placed and controlled by sections based on the different heating requirements of a tool. Instead of a heating circuit, other heating mechanisms can be employed. Thus, in this disclosure a general term "heating elements" is used to mean heating circuits as wells as other heating systems. The heat flux supplied by a heating wire is significantly lower than the heat flux supplied by a cartridge heater for the same input power (heat flow) due to the difference in surface area. This enables introducing more heating power (higher heat flow) into the printed tool without melting the polymer around the heating wire, and as a result of this higher input power, a higher temperature can be achieved at the surface of the printed tool. In addition to the improvements in tool heating, this technology potentially reduces the energy required for heating a tool due to the thermal insulation provided inherently by the polymer. Either Direct Current (DC) or Alternating Current (AC) can be seamlessly used for powering the system. This disclosure describes the use of heating wires embedded as circuits inside printed tools. Heating circuits can be printed in-situ in a printed mold through different means including, but not limited to, coextruding the heating wire together with the printing material, inserting a pre-shaped wire circuit between two adjacent layers or using an automatic wire dispenser like the one conceptually developed and presented below.

Figure 2:
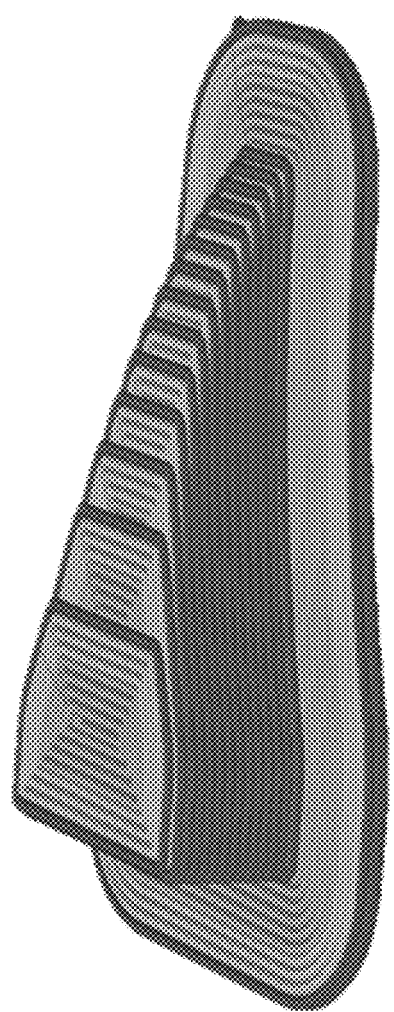
FIG. 2 shows slicing process used in the EDAM to translate CAD files to layers and machine code.

EDAM process begins with a CAD (Computer-Aided Design) file corresponding to a geometry. FIG. 1 is an example of a CAD geometry of a one-sided mold to be fabricated by additive manufacturing. For purposes of this disclosure, the term "one-sided mold" is used to describe a mold that is used to produce a part which results in a surface finish controlled by the mold on only a section of the surface of the part being fabricated. It should be recognized that the principles, concepts and methods and apparatuses of this disclosure apply to molds that are not one-sided and can be easily adopted by those skilled in the art for many other types of mold configurations. For the production of molds, two CAD geometries are created. The first is the desired net shape of the part, as shown in FIG. 1. The second geometry is a slightly modified geometry so that printed bead, as known to those skilled in the art, centers aligned with the surface of the net shape part. Following geometry creation, a slicing software is used to determine the machine path for the printer that will be used to build the part layer-by-layer as seen in FIG. 2, which shows the slicing process that translates CAD files to layers and machine code. Many open source slicing software packages such as Slic3r or ReplicatorG as well as commercial software such as Simplify3D are available. Slicing can be performed with certain types and amounts of infill allowing a structure to be built that is not necessarily fully densified. Partially filled structures allow significant material savings to produce equivalent final shapes.

Figure 3:
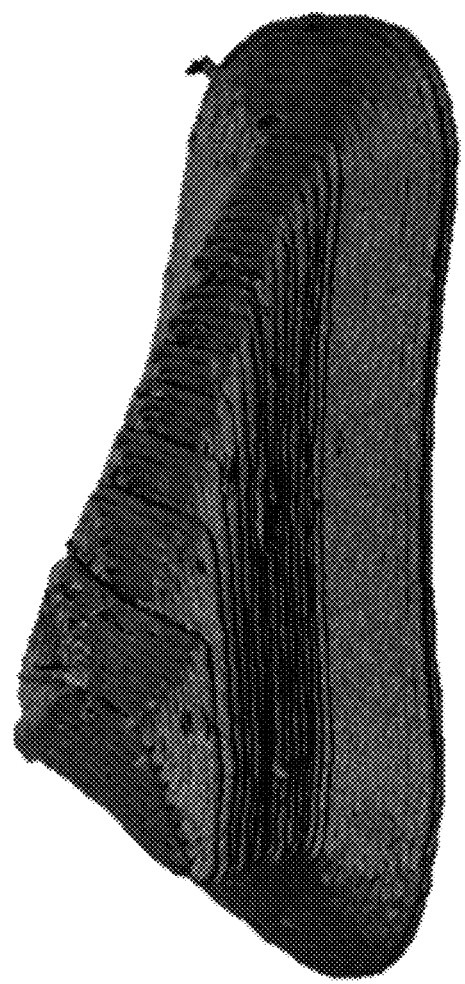
FIG. 3 is a representation of a part (corresponding to geometry in FIG. 1) printed using Extrusion Deposition Additive Manufacturing (EDAM) method.
Figure 4:
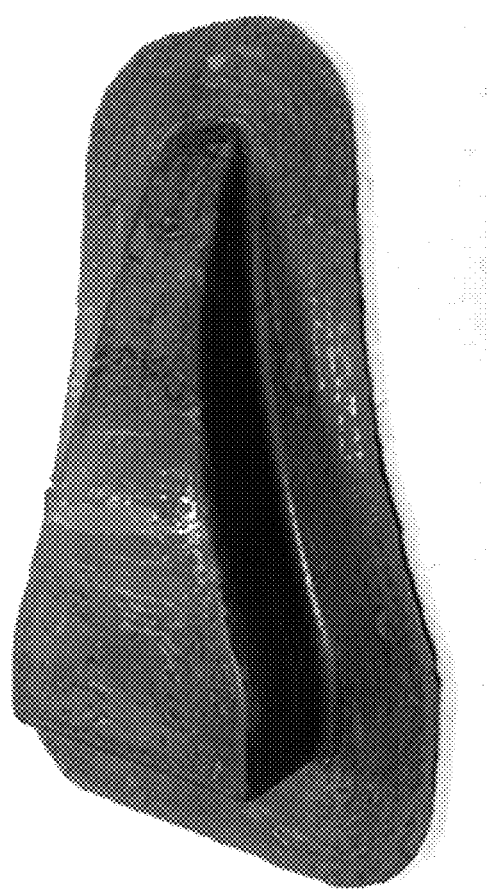
FIG. 4 shows a part after the machining process used for smoothing the printed surface.

FIG. 3 is a representation of a part (corresponding to the geometry indicated in FIG. 1) printed using EDAM. Parts such as the one shown in FIG. 3 have scalloped surface finish prescribed by the resolution and dimensions of the printed bead. Therefore, when a large-scale printer with greater bead diameter and thickness is utilized, printed parts will have a more pronounced scalloped surface finish. Furthermore, it becomes more difficult to fabricate part curvatures appropriately. Post processing such as, but not limited to, machining is used to compensate for scalloped surface finishes and to take a printed geometry from near net shape to net shape. FIG. 4 shows a part after the machining process used for smoothing the printed surface.

Figure 5:
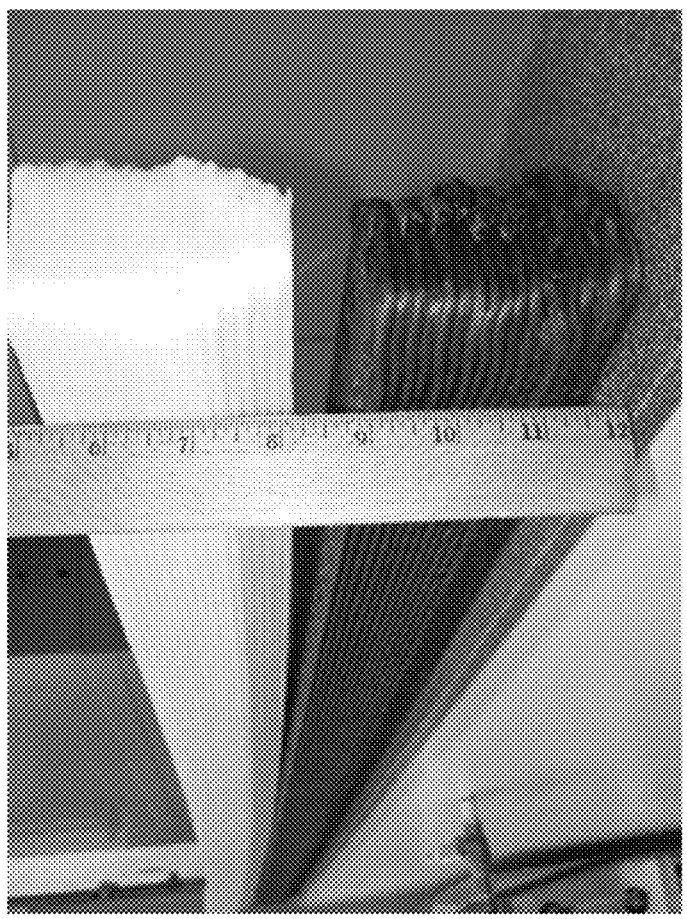
FIG. 5 shows Warping of ABS vs CF-ABS in Large Scale EDAM (Figure taken from L. J. Love, V. Kunc, O. Rios, C. E. Duty, A. M. Elliott, B. K. Post, R. J. Smith and C. A. Blue, "The importance of carbon fiber to polymer additive manufacturing," Journal of Materials Research, vol. 29, no. 17, pp. 1893-1898, 2014).

A limiting factor of polymer AM on the size of printed parts via EDAM is excessive distortion which can result in failed prints. In order to print large parts, this distortion must be suppressed. The root cause of the distortion is the addition of hot materials onto previously cooled materials. The newly added hot material contracts as it cools developing tensile stresses while inducing compressive stresses in the previously cooled material. These stresses can relax in the form of deformation causing the warping of the neat ABS (white) beam seen in FIG. 5 (Figure taken from L. J. Love, V. Kunc, O.-Rios, C. E. Duty, A. M. Elliott, B. K. Post, R. J. Smith and C. A. Blue, "The importance of carbon fiber to polymer additive manufacturing," Journal of Materials Research, vol. 29, no. 17, pp. 1893-1898, 2014), which shows warping of ABS vs CF-ABS in Large Scale EDAM. Referring to FIG. 5 the white upper beam is made out of non-reinforced ABS while the black lower beam is made out of carbon fiber reinforced ABS. It is clear from FIG. 5 that the non-reinforced ABS has exhibited significant warpage relative to the reinforced ABS. Studies in literature have identified carbon fiber filler as an enabling technology for large scale additive manufacturing. The carbon fiber serves a dual purpose in reducing warpage. First, the low Coefficient of Thermal Expansion (CTE) of the fibers in their longitudinal direction results in reduced overall CTEs of the printed composite material. This reduction of CTE however, is primarily in the bead direction due to fiber alignment induced by convergence and shear flow in the extrusion nozzle. Second, the fibers result in significant increase in elastic modulus in the bead direction. Therefore, lower strains are introduced by the temperature gradients and thus the warping is reduced as it can be seen for the carbon fiber filled ABS (black) beam illustrated in FIG. 5.

The introduction of carbon fibers to the printing materials, while resulting in reduced warping magnitudes, introduces significant anisotropy into printed parts. Furthermore, the anisotropy is present in all flow, thermal and mechanical properties.

The thermal conductivity of the printed material used in EDAM is also anisotropic, yet can be captured through three thermal conductivities that describe the heat conduction through the printed material. Specifically, the heat conduction parallel to the bead direction is about an order of magnitude larger compared to the directions transverse to it. This is due to the fact that the neat polymer has the properties of a heat insulator with a very low thermal conductivity, while carbon fibers are good heat conductors. With the flow-induced alignment of the fibers parallel to the bead direction, the fibers increase the conduction in this direction significantly. For the application of heating a composite 3D printed tools, this has to be considered while designing the locations of the heating elements. As a consequence, the design can be a challenge since the heat conduction is more complicated to describe than for an isotropic material, however, it also enables the tailored design of a printed tool to optimize for external heat technology implementation. Since the neat polymer is a heat insulator, achieving sufficient tool surface temperatures for a curing process using traditional heating technologies could result in local melting of the polymeric material in the vicinity of the heaters. Therefore, another benefit of adding carbon fibers becomes apparent as they help to distribute the heat towards the regions of the tool where it is needed.

The design, manufacturing, and testing of tooling for a variety of applications (trimming/machining, wet layup composites, out of autoclave composites, autoclave composites, compression molding, hot stamping, Resin Transfer Molding (RTM), High-Pressure Resin Transfer Molding (HPRTM)) is one of the most expensive and time consuming portions of a product development cycle that often requires multiple iterations. Specifically, tooling for the production of composite parts must have the following five characteristics. First, a relatively low CTEs, preferably matching that of the part being produced. Second, the capability for in process thermal management to ensure that the composite is maintained at temperatures appropriate for the manufacturing process of a component. Third, a smooth surface finishes as the tool surface finish directly affects the surface finish of the component fabricated with the tool. Fourth, a completely sealed surface or vacuum integrity to avoid leaks. Fifth, a high thermal stability to preserve the shape of the tools at temperatures up to and in excess of 180° C.

Figure 6:
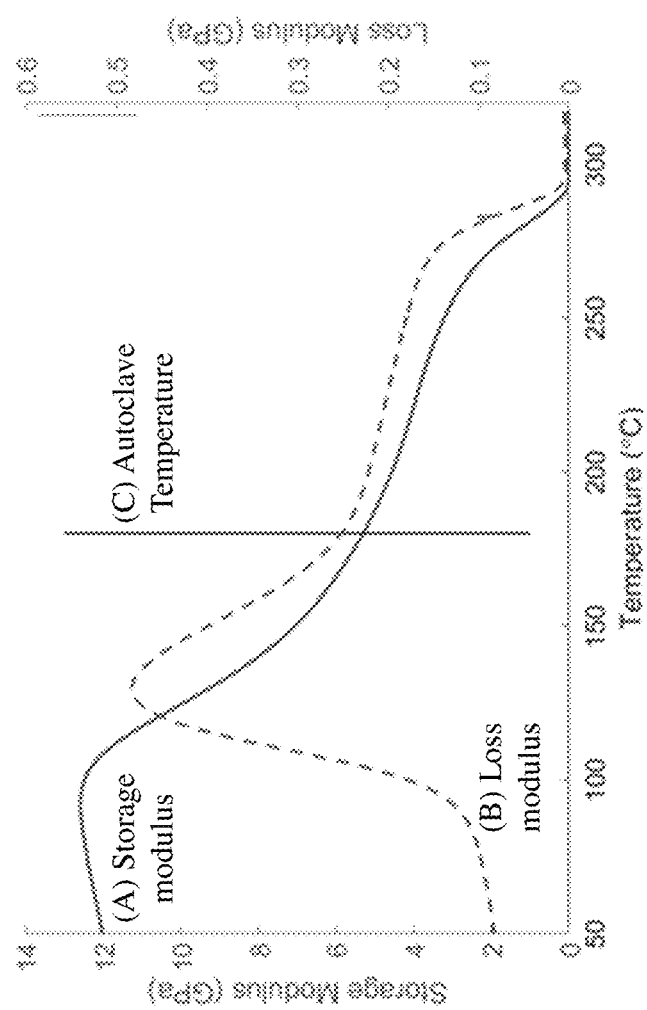
FIG. 6 shows Effect of temperature on the storage modulus of 50 wt % carbon fiber filled PPS characterized through DMA FIG. 7 Phase transition of the polymer (50 wt % carbon fiber filled PPS) characterized using DSC.
Figure 7:
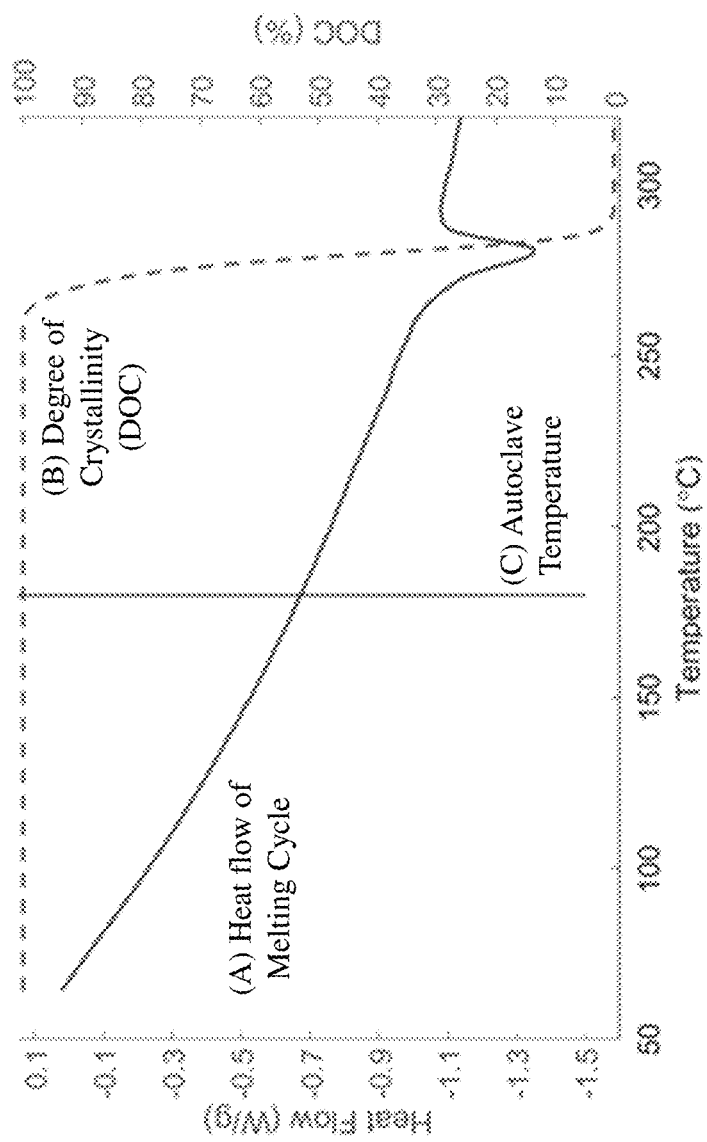

With these requirements considered, AM via EDAM with carbon fiber filled high temperature polymers such as PPS and PEI is a promising method for composite tool production. The low CTE required in printed tools can be achieved by tailoring the orientation of individual beads within a part while considering the anisotropic behavior of a bead as previously described. Appropriate surface finish and vacuum integrity can be attained by machining tools from near net shape to net shape. Thermal stability is one of the most important concerns. A tool must be able to maintain significant mechanical stiffness while at elevated temperatures. Therefore, an appropriate printing material must be chosen. In experiments leading to this disclosure, 50 wt % carbon fiber filled PPS was utilized. FIGS. 6 and 7 show example results of a material system of this disclosure from both Dynamic Mechanical Analysis (DMA) and Differential Scanning calorimetry (DSC). FIG. 6 shows the Effect of temperature on the storage modulus of 50 wt % carbon fiber filled PPS characterized through DMA. Similarly, FIG. 7 shows the phase transition of the polymer (50 wt % carbon fiber filled PPS) characterized using DSC. The DMA results show that even at 180° C., the printed composite material still possesses significant modulus only reduced by about a factor of two versus the room temperature modulus. On the other hand, the DSC results show that melting of the crystalline regions of the printed PPS occurs until around 270° C. which corresponds to the same temperature point at which rapid loss of modulus is seen in the DMA results shown in FIG. 6.

In the following detailed description, in-process thermal management will be addressed for additive manufactured tools, which is required for many composite tooling application. Specifically, the issues involved with the application of traditional heating technologies will be discussed and an in-print heating element insertion technique of this disclosure will be detailed.

Several technologies have been developed over the last few years for heating tools used in polymer and composites processing. Tools are traditionally made from high-thermal conductive materials like steel or aluminum alloys but in some cases, materials like carbon fiber composites or glass fiber composites are preferred due their low CTE. Depending on the processing technique used for producing a part, the tool is self-heated or heated by external ways, namely flowing heated air around the tool (referred to as forced convection). Autoclave-cure processes use forced convection for heating the tool while Resin Transfer Molding (RTM), Vacuum Assisted Resin Transfer Molding (VARTM), hot stamping, and Injection Molding (IM) tools are heated through heating elements embedded inside the tooling. The technologies preferred for tool heating include the use of cartridge heaters embedded in the tool, mat heaters attached to the back side of the tool surface, and heat-transfer fluids pumped through channels built into the tool. Determining which of these technologies is more adequate for a giving application depends mostly on the thermal conductivity of the tooling material and the tool design. Cartridge heaters are preferred in tools made from high-thermal conductive materials, while mat heaters are preferred on tooling surfaces composed of thin sections of good thermal conductors. On the other hand, pumping heat transfer fluids is preferred in applications where tools are made from not only good thermal conductors, but also from materials combined with designs that withstand the pressures developed inside the channels.

The use of each of these different heating technologies in printed tools made with carbon fiber reinforced polymers is addressed below. As mentioned before, the orthotropic thermal conductivity of the printed material facilitates heat conduction in the direction where the fibers are oriented, while hindering heat conduction in the direction transverse to the fibers. This non-isotropic behavior brings additional challenges in tool heating that are not encountered in traditional tooling materials. As a result of the limitations found by using traditional heating technologies in printed tools, a novel localized heating technology is described in this disclosure. This technology of this disclosure enables using printed molds in high temperature applications and allows local temperature control on tooling surfaces through heating circuits placed in-situ during the fabrication process of the tools.

Figure 8:
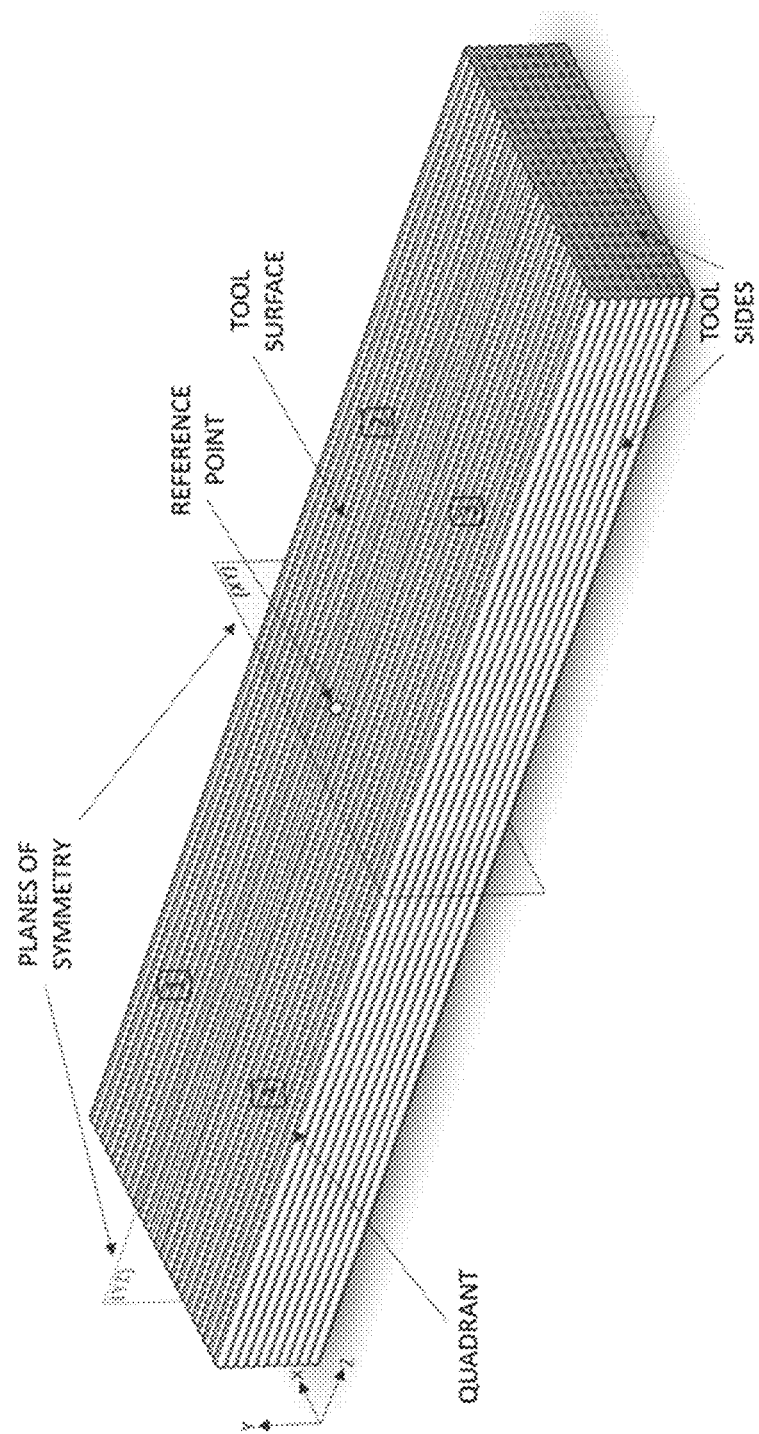
FIG. 8 shows the representative tool geometry used in heat transfer analyses comparing different technologies for tool heating.

The performance of existing technologies for heating printed molds was assessed by comparing temperature gradients developed on a representative tooling geometry equipped with four different heating technologies including the novel technology of heating circuits concerned with this patent application. FIG. 8 shows the representative tool geometry used in heat transfer analyses of each heating technology. In simulations, different heating technologies were applied to the geometry shown in FIG. 8. Large temperature gradients during molding processes could give rise to defects and residual deformations on the molded part, and thus the importance of uniform tool temperature. The steady-state temperature distribution at the surface of the representative tool was determined through a 3D-Heat Transfer (HT) analysis carried out using a commercial finite element tool (Abaqus). For these analyses, orthotropic thermal conductivity was introduced based on the coordinate system defining the orientations in FIG. 8. The printing orientation, which is the Z-direction according to FIG. 8, has the highest thermal conductivity (assumed $$k_Z = 3\left(\frac{W}{m^{2\circ} C.}\right),$$

while the transverse orientations (X and Y) are the ones with the lowest thermal conductivity (assumed $$k_X = k_Y = 1\left(\frac{W}{m^{2\circ} C.}\right).$$

Owing to the symmetry of the printed geometry, the two planes in FIG. 8, split the geometry into four identical quadrants, thereby simplifying the HT analysis. As a result, just one of these quadrants was modeled.

The process conditions considered in the HT analyses are relevant for RTM and VARM processes and include convective losses from the surface and the sides of the tool. The tool surface, which is covered with the material to be processed and additional layers of release films and other miscellaneous plies, was treated as a surface subjected to natural convection with a constant film coefficient of 10 W/° C. On the other hand, higher convective losses from the sides of the tool, which are completely exposed to the surroundings, were treated with a film coefficient of 15 W/°

C. Finally, the bottom tool surface was assumed to be perfectly insulated for all the cases except the mat heaters as detailed below.

In addition to comparing the temperature gradients on the tooling surface, the maximum temperature developed around the heat sources was examined for the four heating technologies. A reference point, located at the intersection between the two planes of symmetry and the tooling surface, functioned as control point throughout the analyses with the different technologies. For each case, two analysis were carried out aiming to achieve 150° C. and 180° C. at the control point, respectively. By doing so, temperatures around heat sources were compared at the same target surface temperature. Excessive temperature could cause local melting of the printed material thereby compromising the stiffness of the material in that region and distorting the tooling surface. Further, an additional analysis explores the temperature limits of the tool with the different technologies by bounding the maximum allowable temperature near the heat source. The following section details the treatments made for modeling the different heating technologies.

Figure 9:
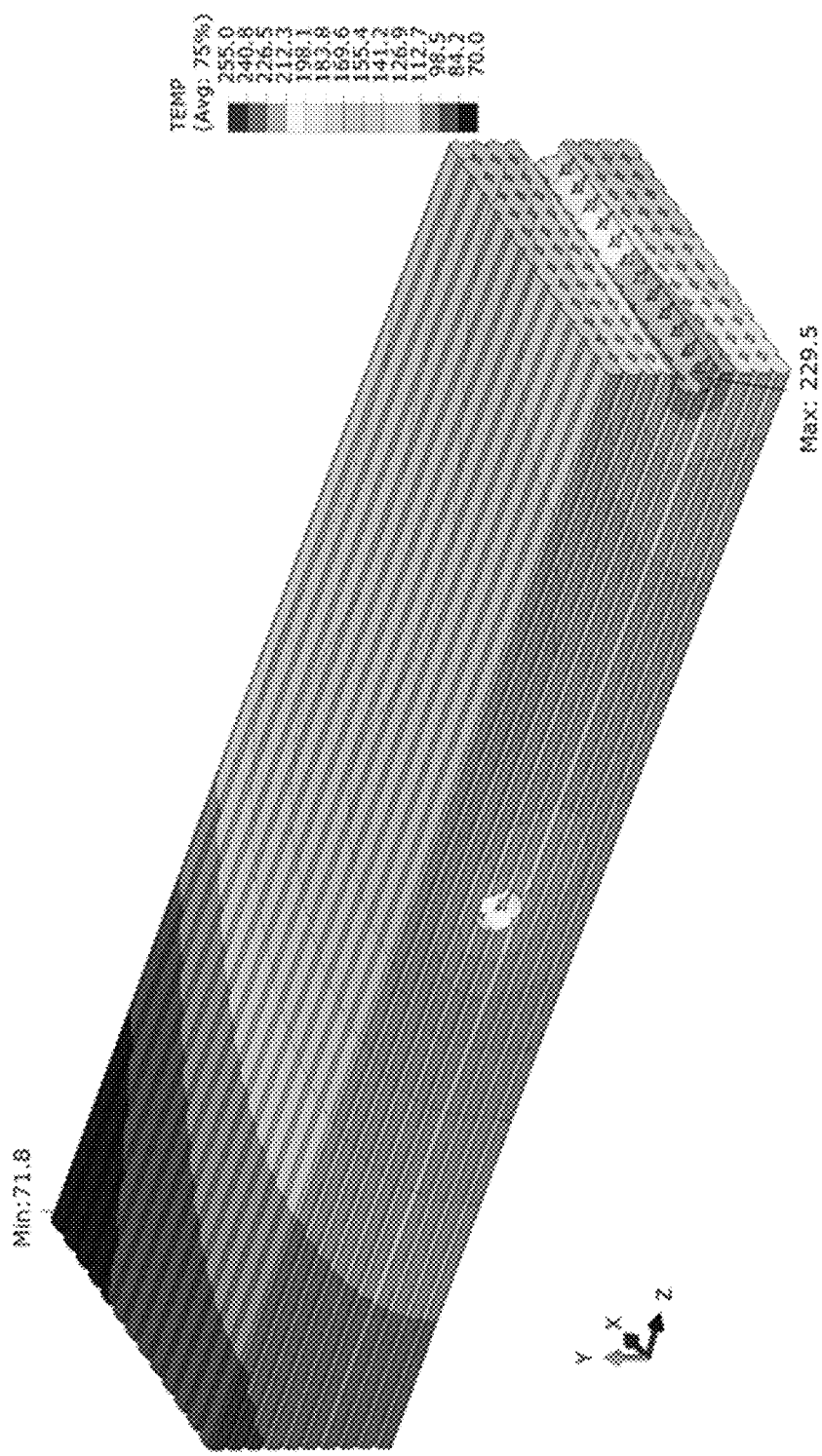
FIG. 9 shows temperature distribution developed in a printed tool (corresponding to geometry of FIG. 8) heated with cartridge heaters for a temperature set point of 180° C. (temperature set point located at the reference point of FIG. 8).

Cartridge Heaters (CH) are one of the preferred choices for heating metallic tools due to their low cost and easy implementation. CHs impose a constant heat flux, q", that can be approximated as the ratio of the input electrical power to the surface area of the cartridge heater ($q''=w/m^2$). The printed tool modeled in this analysis was equipped with three commercially available cartridge heaters equally spaced along the mid-plane of the tool. Each CH delivers a maximum heating power of 45 W. All the cartridge heaters were inserted transversely to the orientation with highest thermal conductivity. With this configuration, the higher conductivity in the z-direction aids in distributing the heat parallel to the beads reducing the temperature gradients in this direction. FIG. 9 shows the temperature distribution on the tooling when the control temperature was set to 180° C. at the control point. It is worthwhile mentioning that due to the linearity of the heat transfer analysis the temperature distribution on the tooling surface is linearly scaled with the control temperature. Thus, only the results for a control temperature of 180° C. are included. Reaching 180° C. at the control point with CH, introduced temperatures up to 229.5° C. around the heat source as shown in FIG. 9, which could compromises the integrity of the structure in this zone. Hence, the maximum temperature that can be achieved with CH at the control point was 157.6° C. based on a maximum temperature of 200° C. recommended for this material.

Although pumping Heat Transfer Fluids (HTF) through channels built into tools is costly and difficult to scale, this technology has been widely used in tooling applications due to its capacity for providing not only controlled heating but also active cooling. Conventionally, HTF is pumped through either channels machined in the tooling or tubing attached to the backside of the tooling. Further, this technology requires more complex pressure and temperature control systems to achieve a constant temperature along the channel and thus on the tooling surface. Even though fluid channels can be readily build during the 3D printing process, there are two main limitations for the adoption of this technology. First, the porous structure inherent to the bead-by-bead manufacturing process would cause fluid leakage and pressure drops. Second, excessive forces due to the internal pressure could deform the tooling surface and cause local damage in the structure.

Modeling the use of HTF for heating a tooling utilized the following conditions. First, it was considered that the thermal boundary layer in the channel is fully developed and thus a constant temperature condition along the tube was assumed. Second, the HTF channels were located perpendicular to the orientation with the highest thermal conductivity. Since the orientation of the channels is also symmetric with respect to the planes shown in FIG. 8, both planes of symmetry were used in the heat transfer analysis for the tool equipped HTF channels.

Figure 10:
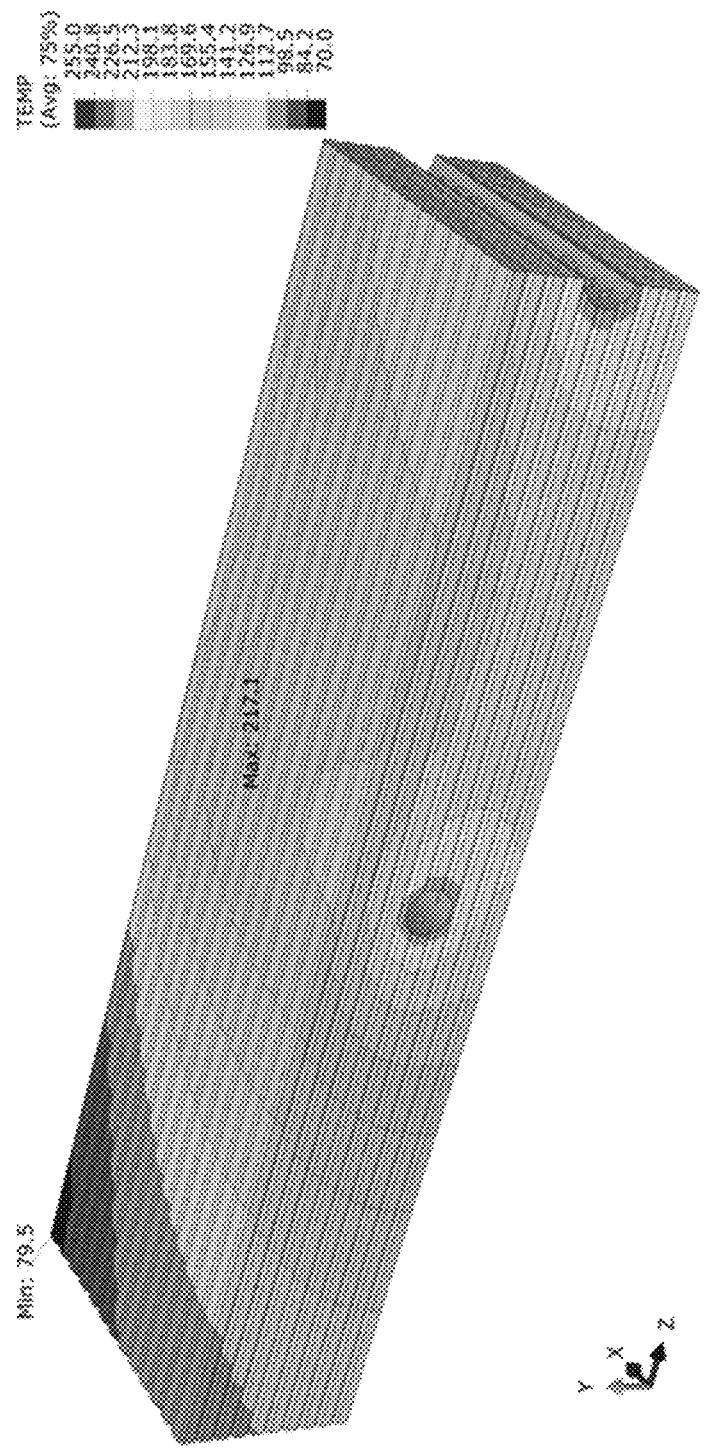
FIG. 10 shows Temperature distribution developed in a printed tool (corresponding to geometry of FIG. 8) equipped with channels for heat transfer fluid for a temperature set point of 180° C. (temperature set point located at the reference point of FIG. 8).

FIG. 10 shows that the temperature of the HTF must be higher than the temperature recommended for this material (200° C.) to achieve the desired temperature at the control point (180° C.). Thus, the maximum temperature that can be achieved without compromising the structural integrity of the material was determined to be 166.1° C.

Heating tools with Mat Heaters (MH) is the preferred choice for achieving uniform tooling temperatures when the tool is made from thin sections of materials with high thermal conductivity. Since MH are semi-flexible, those are conventionally bonded to the back side of tooling surfaces and provide a constant heat flux that is controlled to achieve a uniform temperature on the tooling surface. Typical construction of MH comprises heating ribbons embedded in silicone rubbers or polyamide which are characterized by their low thermal conductivity. However, the thermal insulation further limits the maximum temperature that can be achieve with MH.

Figure 11:
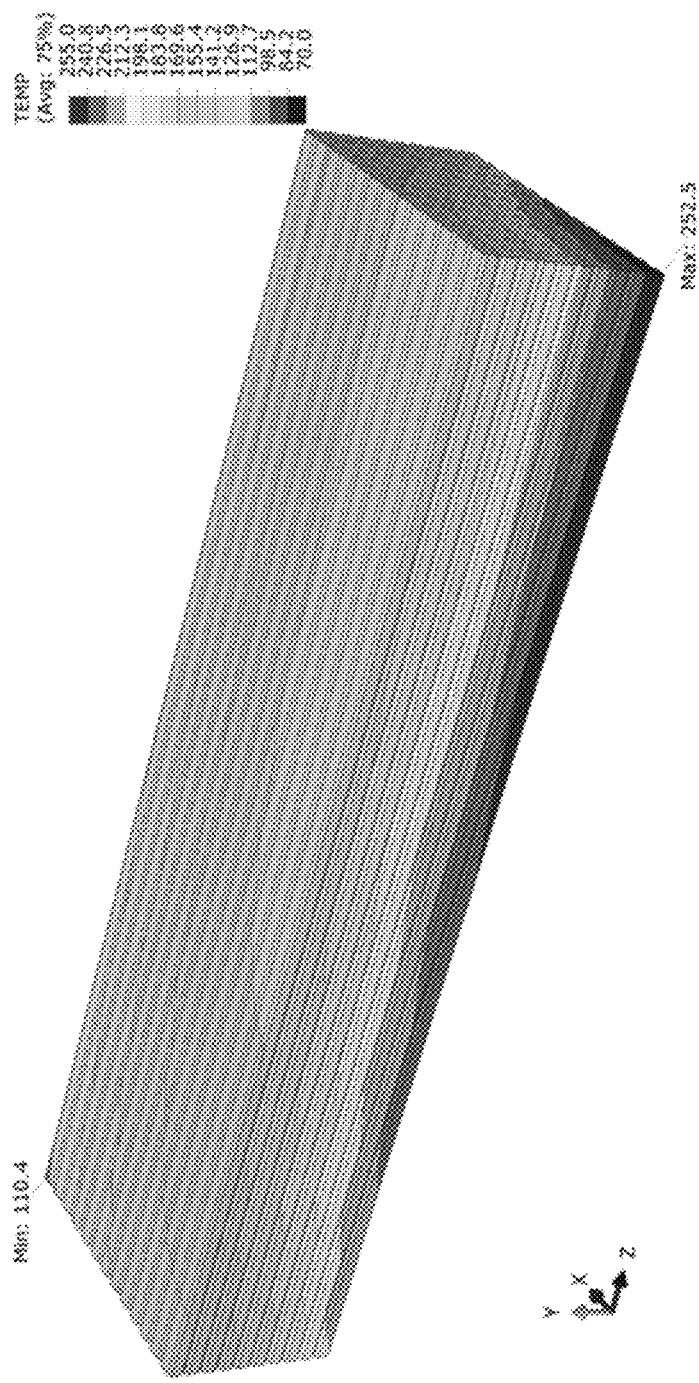
FIG. 11 shows temperature distribution developed in a printed tool (corresponding to geometry of FIG. 8) equipped with mat heaters for a temperature set point of 180° C. (temperature set point located at the reference point of FIG. 8).

For the heat transfer analysis, a constant heat flux provided by the MH was applied through the bottom side of the tool neglecting the thermal resistance between the MH and the tool. This last assumption is appropriate for the analysis as long as the bottom surface is finished and the mat heater is perfectly bonded to the surface. FIG. 11 shows the temperature distribution in a tool equipped with a mat heater at the bottom surface of the tool. While a uniform temperature distribution on the tool surface is achieved with MH, temperatures above the maximum recommended temperature, 200° C., develop on the surface where the MH is bonded. Thus, the max temperature that can be achieved at the reference point without deteriorating the performance of the tool was 144.3° C.

Figure 12:
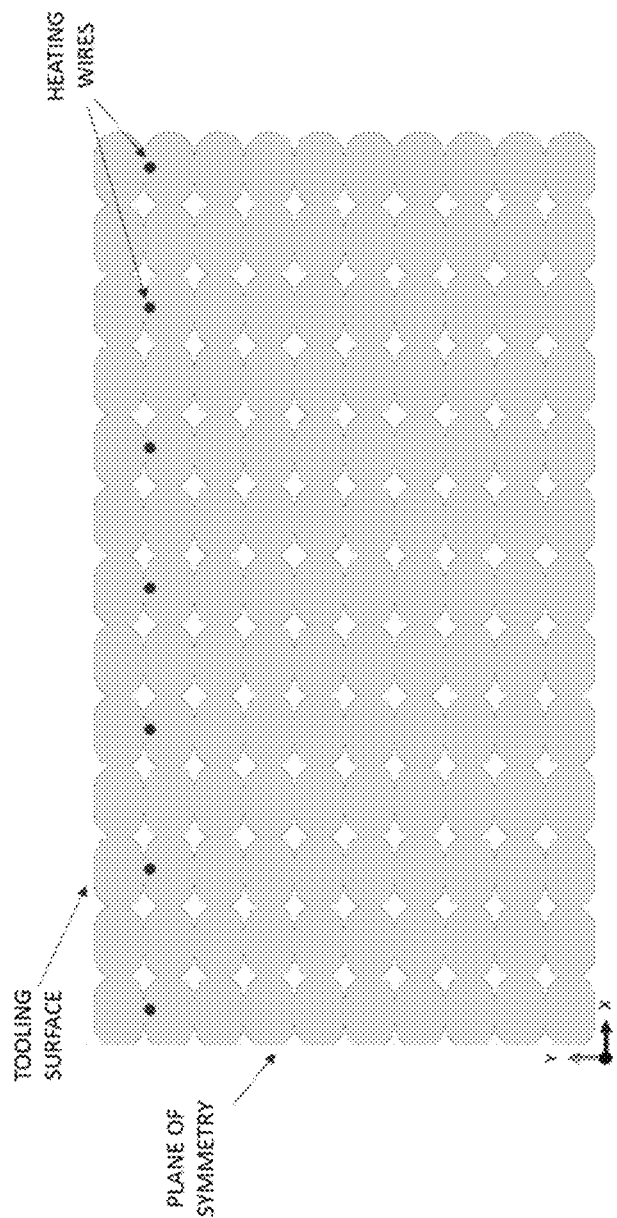
FIG. 12 shows cross-sectional view of printed tool (corresponding to geometry of FIG. 8) equipped with heating circuit.

The previous analyses have shown that the limiting factors for adopting existing heating technologies on printed tools are both the low thermal conductivity and low melting temperature of the polymeric material. Hence, the concept of embedding Heating Circuits (HC) during the printing process of the tool was developed to enable higher temperature and better temperature control on the tooling surface. By embedding HC near the tooling surface, the heat is not only distributed more evenly on the surface, but also conducted more rapidly to the surface. Wire density in the HC can also be varied depending on the heating requirements of the tool. Further, the orthotropic thermal conductivity can turn favorable for heating with this method by designing the path of the heating wire based on the local material orientation. Multiple HC can be embedded and controlled by zones depending on the heating requirements of a tool. FIG. 12 shows the cross section of a tool equipped with HC used in the HT analysis indicating the embedded heating wires as black dots. The white areas are representative of the voids formed in printing process shown in an exaggerated fashion in FIG. 12.

For the example presented in this disclosure, the heat generated by the circuits is purely governed by the joule heating phenomenon caused when either AC or DC current flows through a conductive wire, however, the same technology of printing heating circuits can be directly applied to tools heated through induction heating of ferromagnetic wires.

Figure 13:
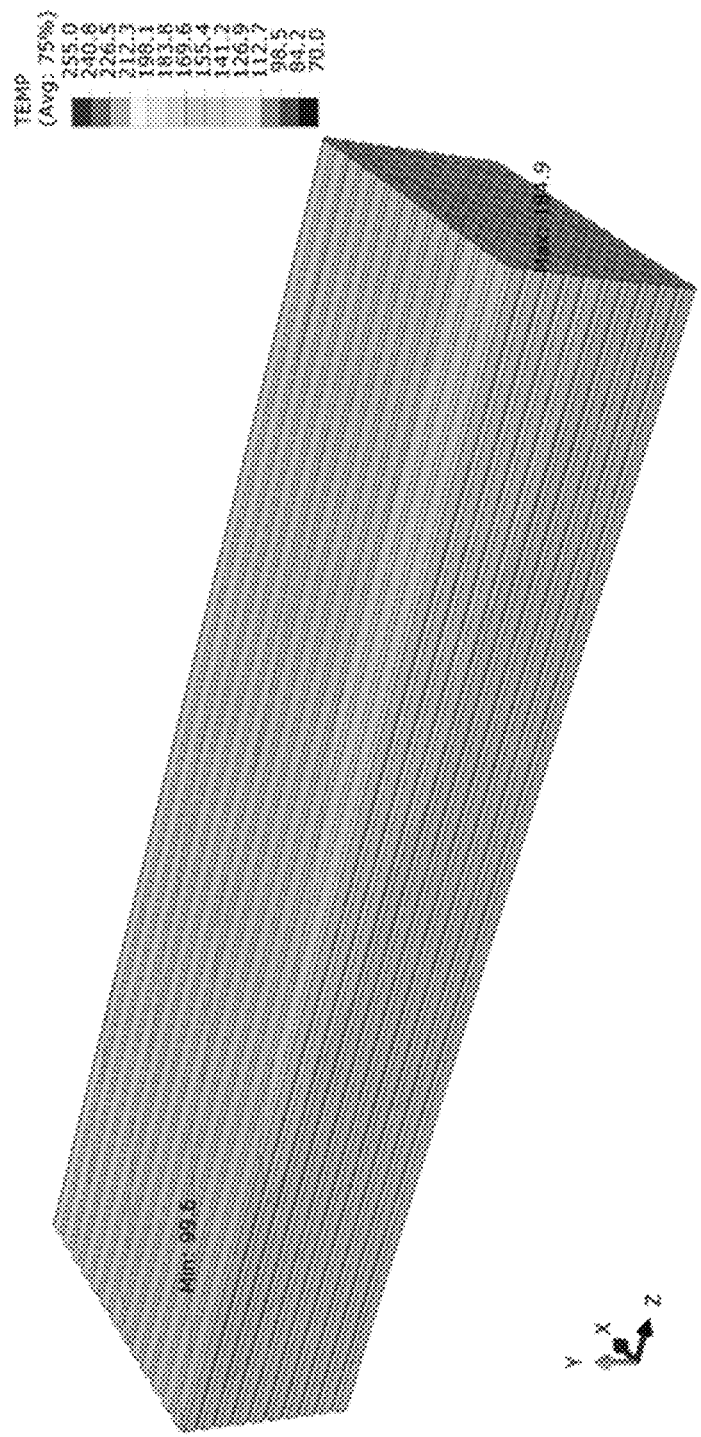
FIG. 13 shows temperature distribution developed in a printed tool (corresponding to geometry of FIG. 8) equipped with heating circuits for a temperature set point of 180° C. (temperature set point located at the reference point of FIG. 8).

FIG. 13 shows temperature distribution of printed tool equipped with heating circuits obtained by setting the temperature at the reference point to 180° C. By comparing the temperature distribution shown in FIG. 13 of a tool equipped with HC with the temperature distribution of other existing technologies three main point must be made. First, the temperature gradients on the tool surface are significantly reduced compared to the HTF and CH technologies. Second, the maximum temperature achieved near the heat source was significantly reduced compared to the other three heating technologies, thereby enabling temperatures on the tool surface above 180° C., namely up to 194.5° C. Third, even though a similar temperature distribution on the tooling surface was achieved with the MH, HC significantly reduced the temperature gradients across the thickness of the tool which reduces the thermal stresses in the tool.

Figure 14:
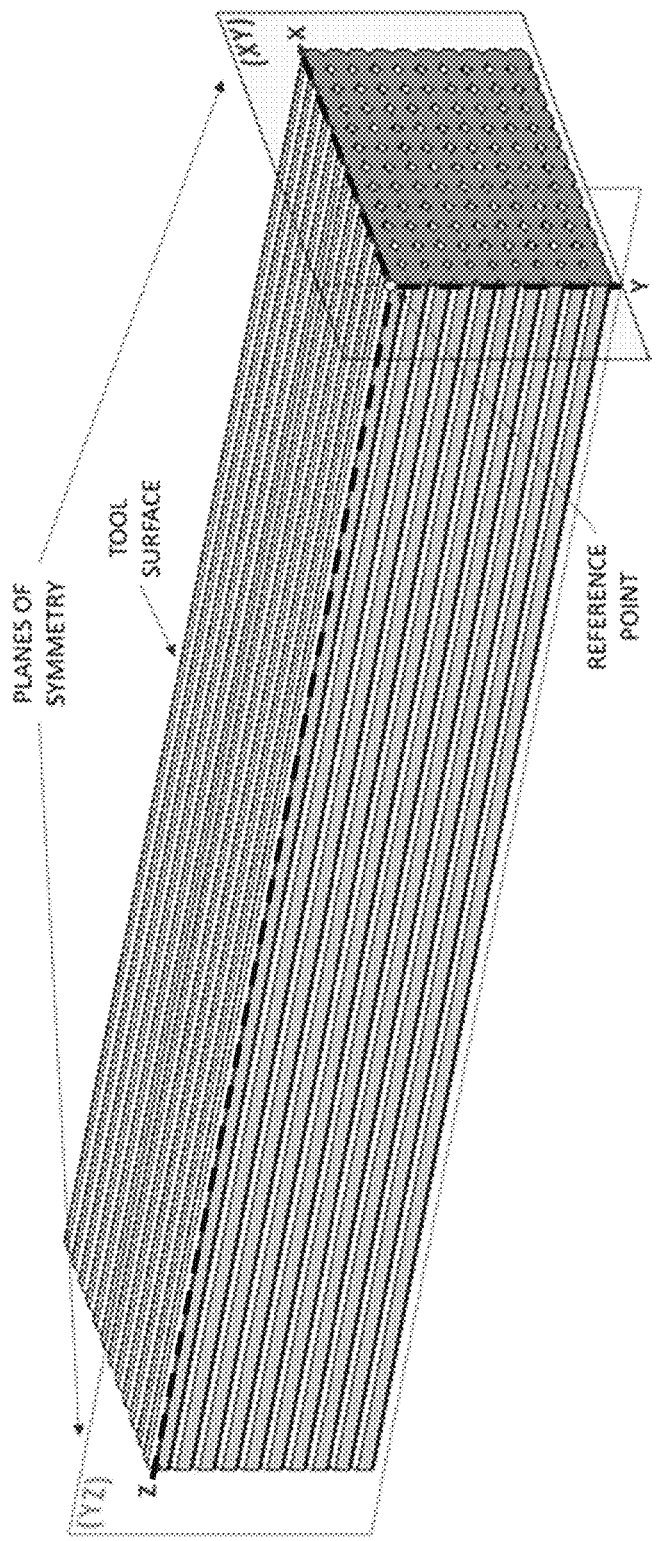
FIG. 14 shows edges of the geometry of FIG. 8 from which temperatures profiles were measured in the simulation model and indicating the local coordinate system.

Previous heat transfer analyses carried out for a printed tool equipped with different heating technologies confirmed the improvement achieved with HC by reducing the temperature gradients on the tooling surface. A quantitative comparison can be made on temperature profiles developed on the tooling surface along the X, Y, and Z axes of the tool. Temperature profiles were created by extracting temperature along the three axes of the coordinate system shown with dashed lines FIG. 14.

Figure 15:
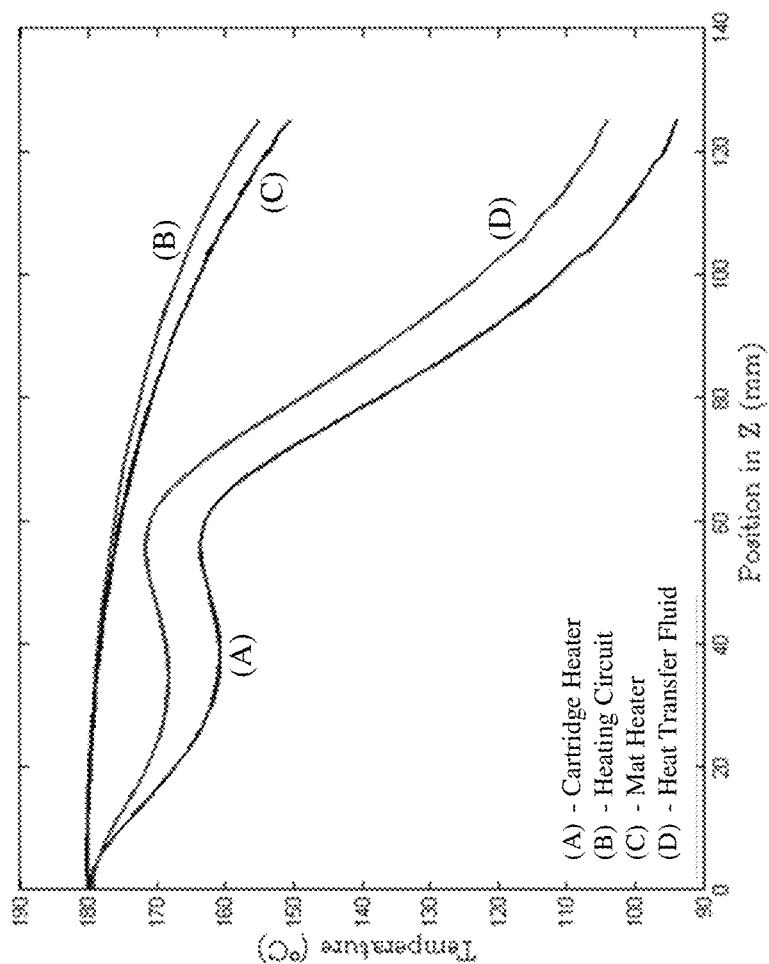
FIG. 15 shows temperature profile developed along the edge oriented in the Z-direction in the tooling surface (corresponding to printed tool and local coordinate system shown in FIG. 14).

FIG. 15 shows temperature profile developed along the Z-direction of the tooling surface. Referring to FIG. 15, one sees a significant reduction in temperature gradients along the Z direction achieved with the HC when compared to the other traditional technologies. The temperature profile obtained using MH follows closely the one obtained with the HC, however, the temperature profiles in a more intricate tool shape will be strongly influenced by the variations in the thermal diffusion distance. In other words, changes in thickness will introduce temperature gradients due to the increase in the heat diffusion distance.

Figure 16:
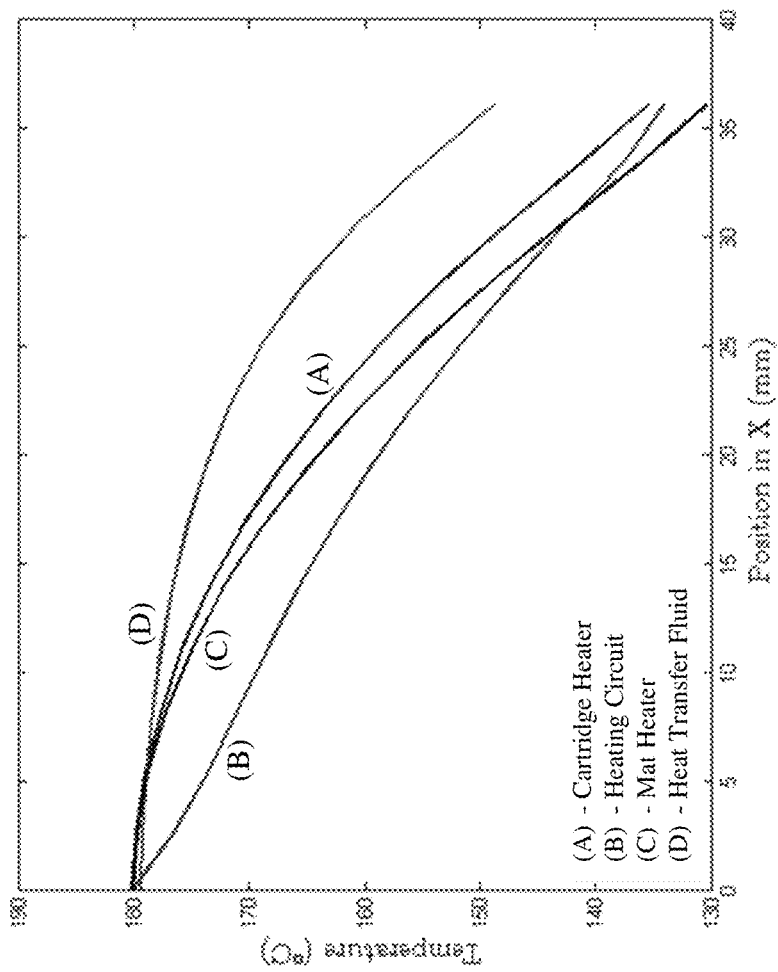
FIG. 16 shows temperature profile developed along the edge oriented in the X-direction at the tooling surface (corresponding to printed tool and local coordinate system shown in FIG. 14).

FIG. 16 shows temperature profile developed along the X direction of the tooling surface. Referring to FIG. 16, one sees that the HC undergoes a more rapid increase in temperature gradient as we move away from the reference point compared to the other technologies, but this response is readily improved with a denser heating circuit.

Figure 17:
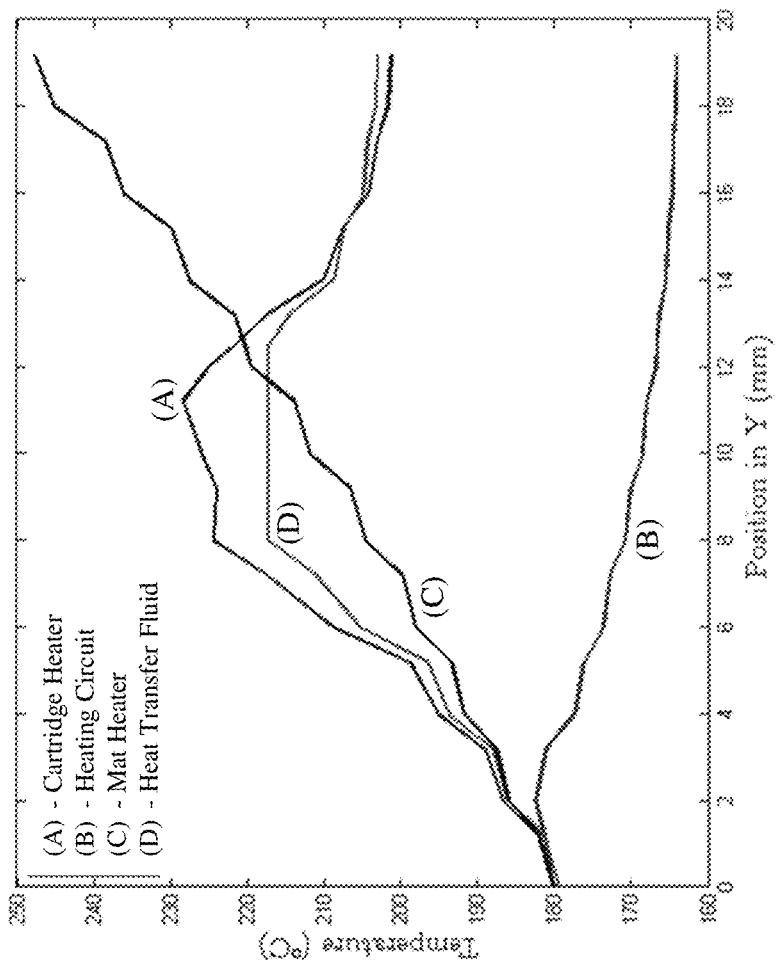
FIG. 17 shows temperature profiles developed through the thickness (Y-direction) of the printed tool (corresponding to printed tool and local coordinate system shown in FIG. 14).

Although both HC and MH exhibited similar temperature profiles on the tooling surface, the HC significantly reduced the temperature gradients in the Y axis. FIG. 17 shows temperature profiles developed through the thickness of the printed tool. Referring to FIG. 17, one notes that this plot also captures the maximum temperature developed inside the tool, which as expected was maximal for the mat heaters. Though the location of the CH or HTF channels can be optimized for reducing the temperature gradients on the tooling surface, the effective use of this technologies in printed tools is still limited by the low-thermal conductivity of the printed composite material.

An additional advantage of using HC compared to CH and HTF is that the former one does not require fully densified structures for containing the heating element or the fluid. Hence, the use of heating wires enables printing more complex tooling surfaces without fully densified support structures, thereby reducing cost, printing time, and heat losses through the foundation of the tool.

In this disclosure, different processes for depositing the HC during the printing process are described and additional benefits of using the methods and apparatus of this disclosure compared to traditional technologies are highlighted.

Heating circuits have demonstrated superior performance reducing temperature gradients on printed tool surfaces compared to other three traditional heating technologies. Since the heating circuits are build-up at the same time the part is printed, minimal post-processing steps are required to use the heating circuits. On the other hand, MH and CH require finished surfaces to achieved good thermal contact, while the HTF requires further preparation for connecting the pumping system to the tool.

It should be noted that HC require good thermal contact with the printing material and in some applications interconnections. According to this disclosure, embedding HC during printing can be achieved through the three different methods described below.

One method of achieving HC in a printed tool is by co-extruding a wire capable of being heated along with the material being printed or dispensed. Co-extrusion is widely used in industrial applications going from processing toothpaste to isolating electrical wires with thermoplastic polymers. However, for embedding heating wires, the traditional co-extrusion must be complemented with a cutting system that controls the length of the heating wire and a compacting mechanism that consolidates the co-extruded wire as it leaves the nozzle. This consolidation step is essential for preserving the co-extruded wire at the desired position and achieve good thermal contact between the printed layers. Such a compaction step can be achieved with a roller following the deposition path or with a mechanical tamper surrounding the co-extrusion nozzle. Pressure developed inside the co-extrusion nozzle can be used to fully wet the surface of the wire and achieve good thermal contact, but the wire should be heated before entering the nozzle to prevent rapid solidification of the printed material around the surface of the wire. Additionally, a simple shear cutting tool is required at the end of the co-extrusion nozzle to trim the wire at the ends of the circuit. The combination of the co-extrusion system, the compacting step, and the cutting tool, will enable scaling the use of heating circuits to more complex tool geometries where circuits need to be placed on different planes and sections.

Another technique to embed HC in the printed mold, according to this disclosure, includes pre-shaping a HC to a shape, such as but not limited to a mesh as an example, that suits the geometry of the printed mold. It should be recognized that the technique of pre-shaping may be well suited and more practical for flat-shaped tools. Since the EDAM process is carried out layer by layer, HC can be embedded in the printed part pausing the printing process at desired locations. Subsequently, HC are manually placed and embedded into the previously-printed layer at particular points with the aid of an external heat source, which will enable proper wetting of the HC with the printed material. Then, the printing process continues and the newly extruded material covers the heating circuit.

Another method of embedding HC during printing is using a system developed in studies leading to this disclosure. For purposes of this disclosure the system is termed Automatic Wire Dispensing System (AWDS). This system combines both the capability of the co-extrusion nozzle to deliver heating wire embedded into the extruded material, and the flexibility of the manual method to orient the heating circuits at any direction in the printed mold.

Figure 18:
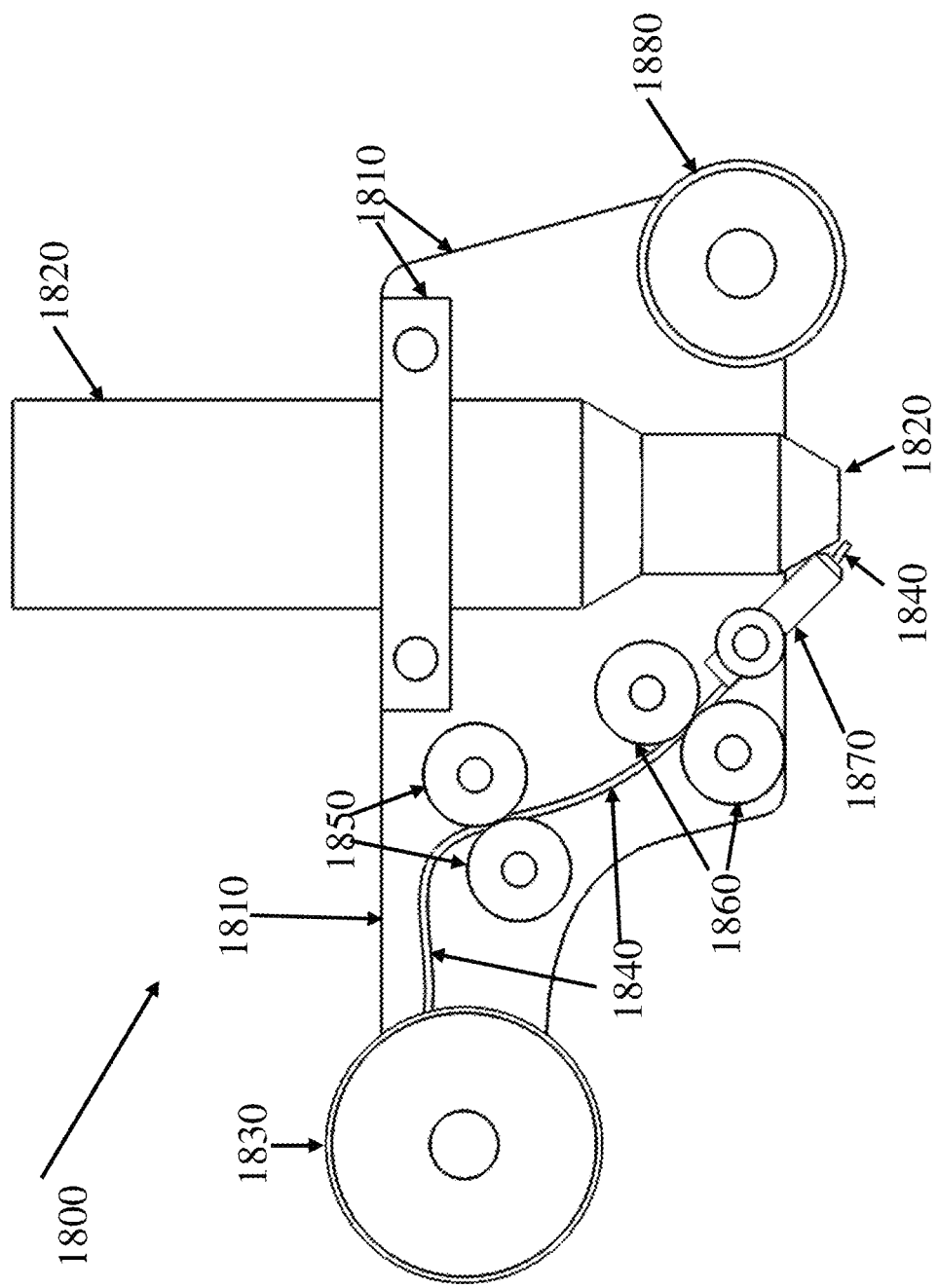
FIG. 18 is a front view of an automatic wire dispensing system (AWDS) of this disclosure.

FIG. 18 is a front view of an automatic wire dispensing system (AWDS) 1800 of this disclosure. Referring to FIG. 18, the AWDS of this disclosure comprises a rotating platform 1810 mounted around the deposition nozzle 1820. The platform 1810 can be configured either to follow a printing path (in the direction shown in FIG. 18) or to follow a preprogrammed path without printing material. A spool of heating wire 1830 mounted on the moving platform 1810 supplies wire 1840 to a first set or rollers 1850 that guides the wire coming from the spool 1830 and provides electrical ground. A second set of rollers 1860 pulls the wire 1840 and supplies a controlled DC voltage that creates a current in the wire 1840 as the wire 1840 travels through the two sets of rollers 1850 and 1860, thereby heating the wire by joule effect. When following the printing path, the wire 1840 is heated and then guided right next to the deposition nozzle 1820 through a ceramic guiding tube 1870. A cutting mechanism (not shown in FIG. 18) located after the second set of rollers 1860 and before the deposition nozzle trims the wire to the desired length during the AM process. The wire is laid down and covered with extruded material (not shown) that is subsequently compacted with a roller 1880 mounted on the same platform. Heating the wire is necessary during this process to fully wet the wire with the printing material, otherwise the printing material might solidify rapidly on the surface of the wire leading to a poor thermal contact. After finalizing a heating circuit, the wire is cut with a cutting mechanism (not shown in FIG. 18) that can be mounted after the second set of rollers 1860. Such a cutting mechanism is not limited to shear cutters.

Figure 19:
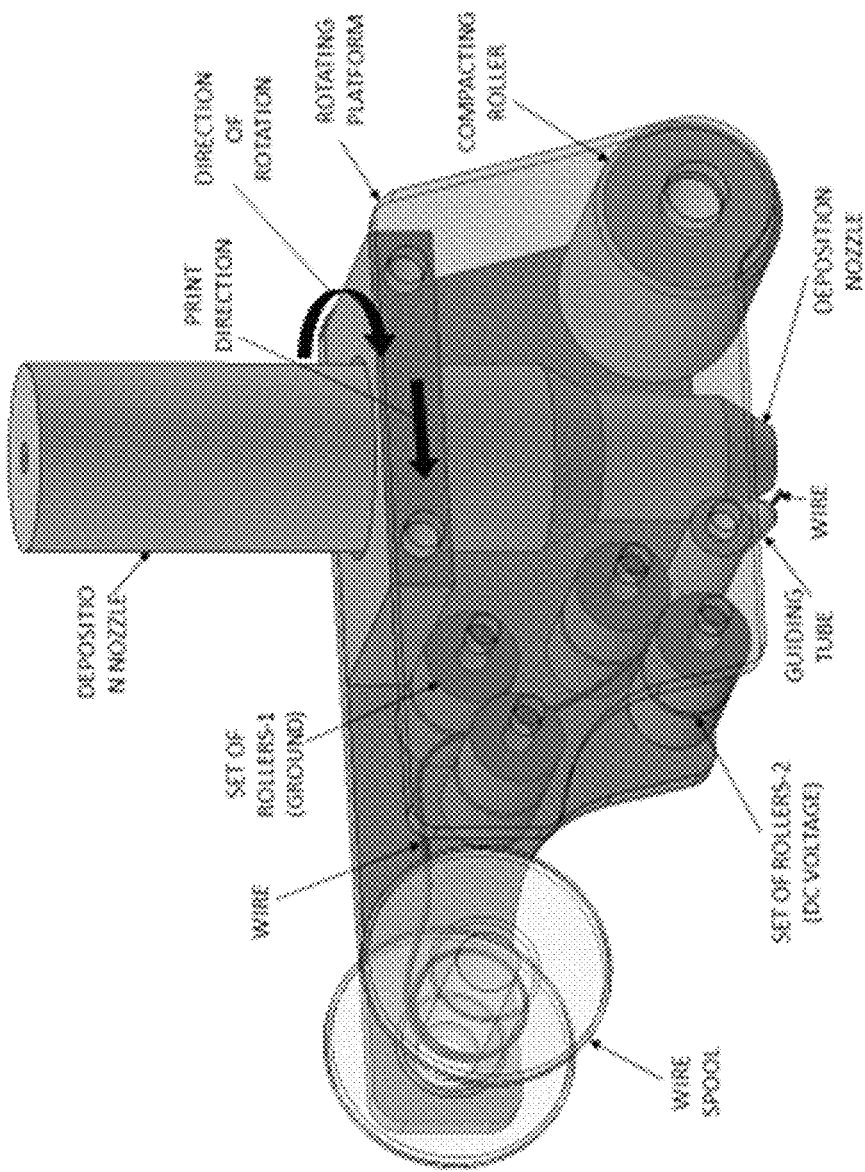
FIG. 19 is a perspective view of an automatic wire dispensing system (AWDS) of this disclosure, the front of view of which is shown in FIG. 18.

FIG. 19 is a perspective view of the automatic wire dispensing system (AWDS) 1800 shown in FIG. 18.

Referring to FIG. 18, in operation, an article such as a mold is fabricated from the material deposited from the depositing nozzle 1820. The wire dispenser comprising spool 1830, rollers 1850 and 1860 is used to introduce the wire into the part being printed. The cutter (not shown in FIG. 18 or 19) is used to control the length of the wire being introduced into the printed part. The compactor 1880 is then used to consolidate or embed the wire into the part being printed.

The AWDS of this disclosure can be also utilized for inserting heating circuits between printing layers without extruding material. This feature is especially useful when HC need to be oriented differently than the printing orientation. To achieve this, the printing process is paused at the layer where the heating circuit needs to be collocated, which gives time to this layer for solidifying. Embedding the heating wire on an already solidified substrate requires, first to move the AWDS closer to the surface where the wire will be placed so that the compacting roller can be used for pressing the wire into the substrate, and second to heat up the wire at higher temperatures so that it can locally melt the region where is laid down. After laying down the heating circuit, the printing process is resumed and continues until another heating circuit needs to be laid down in this manner.

It should be recognized that the co-extrusion method and AWDS enable the use of HC in complicated tooling shapes. For instance, concave tooling will require installing heating circuits on different planes during the printing process, which is readily accomplished with either one of these methods. Furthermore, tailoring the orientation of the heating circuits based on the local material properties and heating requirements becomes possible with the AWDS.

Figure 20:
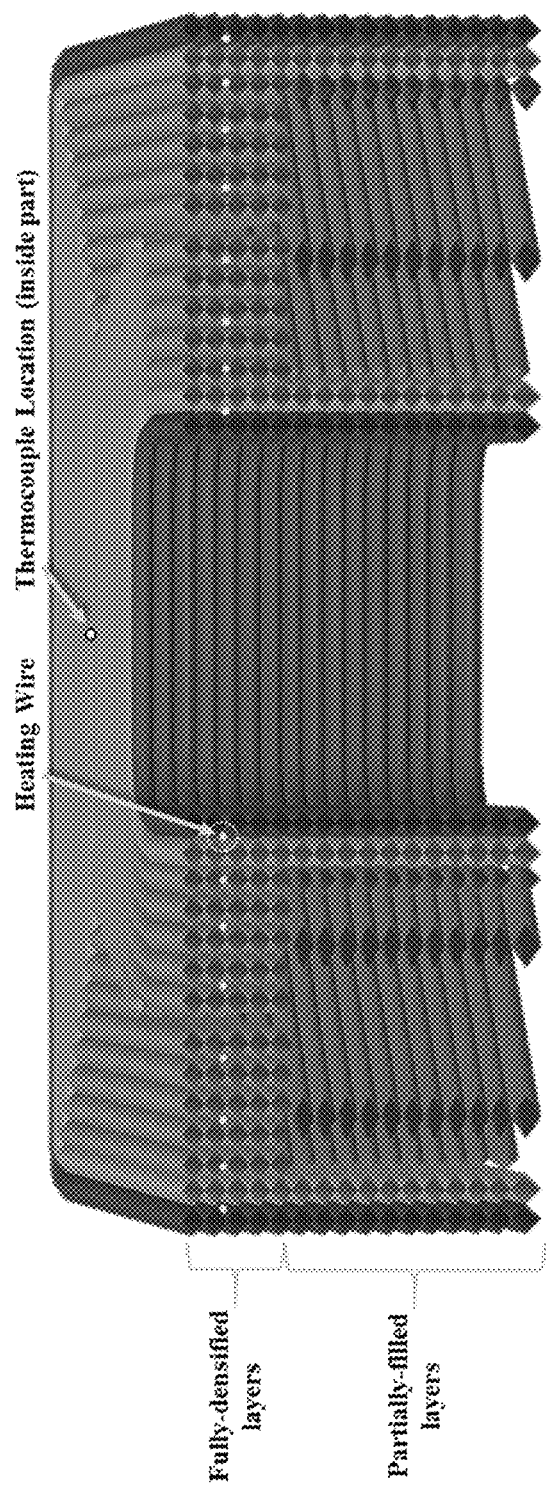
FIG. 20 is a cross-sectional view of a printed tool equipped with a heating circuit and a thermocouple.

A prototype was fabricated using a pre-shaped HC method described above to embed heating circuits and tested to prove the functionality of the HC on a printed tool. A partially-filled tool was printed using 50% by weight of carbon fiber reinforced Polyphenylene Sulfide (PPS). A single heating circuit, made with pre-shaped heating wire, was embedded between two adjacent layers during the printing process of the tool, specifically between the second and third layers located from top to bottom as shown in FIG. 20. FIG. 20 is a cross-sectional view of a printed tool equipped with a heating circuit and a thermocouple. The HC comprises continuous and equally spaced loops of heating wire (Ni—Cr 80/20 alloy). The space between loops was set to around 5 mm which is the equivalent to the width of approximately one and a half printed beads. In FIG. 20, a representative cross-section of the heating wire is indicated with a white dot. The heating circuit is controlled with a digital proportional-integral-derivative (PID) temperature controller, known to those skilled in the art, which uses the temperature readings from a thermocouple embedded at the middle of the part and between the last two upper layers of the printed part to control the power delivered at the heating circuit. A variable-voltage AC source is used to power the heating circuit and allows to scale the heating power simply by varying the voltage of the source. Yet, DC sources can also be used seamlessly with the heating circuits.

Figure 21:
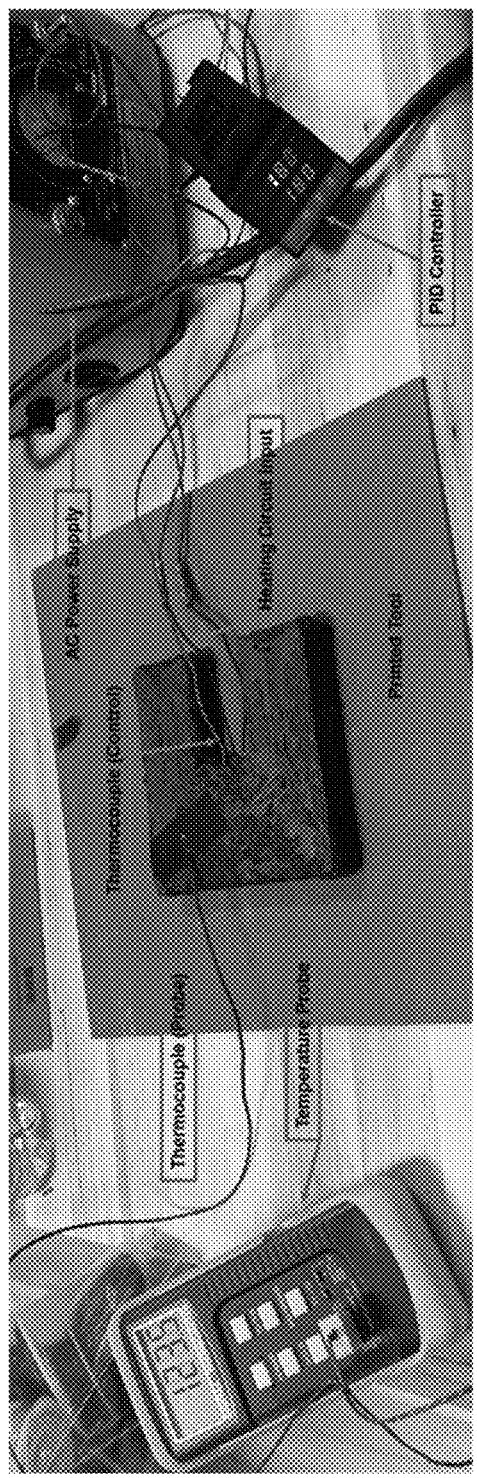
FIG. 21 shows an experimental setup used for testing the printed tool (corresponding to printed tool shown in FIG. 20) equipped with a heating circuit made by the methods of this disclosure.

FIG. 21 shows the setup used for testing the printed tool equipped with a heating circuit made by the method of embedding a pre-shaped HC into the printed part, as described above. A variable voltage AC power supply was employed to power the circuit, and a fixed voltage of 30 VAC RMS was used for this test. The measured resistance of the heating circuit was 14 ohms which combined with the input voltage of 30 VAC delivered a maximum power of 65 W. The temperature was set to 180° C. in the PID controller and the system took around 15 minutes to achieve the desired temperature.

The temperature at the tool surface, measured with an external temperature probe, differed by approximately 57° C. from the set pointed temperature. Such a difference is caused by the combination of the following two factors: first, due to the low thermal conductivity of the printed material in the transverse direction, and second, because the thermocouple is located between the heating elements and the upper surface. Although this temperature gradients across the part are unavoidable, placing the thermocouple of the control system on the tool surface will ensure that the set pointed temperature is achieved.

Figure 22:
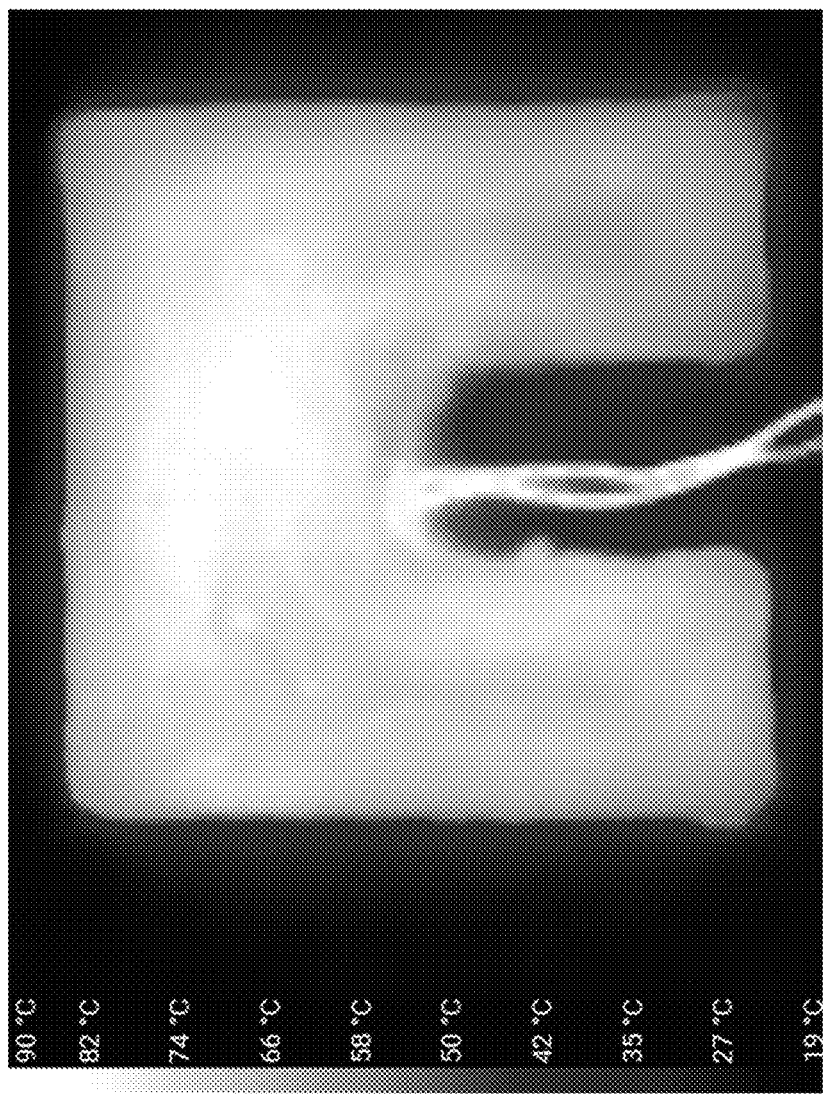
FIG. 22 shows a qualitative map of temperature gradients developed at the surface of the printed tool (corresponding to printed tool shown in FIG. 20).

FIG. 22 shows a qualitative map of temperature gradients developed at the surface of the printed tool. Referring to FIG. 22, a thermo-image captured during the heating test demonstrates qualitatively that there are no significant temperature gradients as shown by the predominantly white color throughout the part. It should be recognized that the temperatures shown in FIG. 22 are not corrected for the emissivity effects inherent in the measurement technique employed. Thus only temperature differences across locations are to be inferred from FIG. 22. The main point of FIG. 22 is to demonstrate absence of significant thermal gradients across the printed part, achieved in part through the deployment of HC.

In this disclosure methods and apparatus to overcome the limitations of using traditional heating technologies in printed tools is described. Specifically, methods and apparatus to utilize Heating Circuits (HC) printed in-situ during the tool manufacturing process was developed. Heat transfer analyses of a representative tool equipped with existing tool heating technologies confirmed the superior performance of HC printed in-situ in reducing temperature gradients. HC embedded in a printed tool enables precise temperature control of the tool by zones, which is not readily achievable with traditional technologies. The so called heating circuits can be also combined with contactless technologies for tool heating, namely induction heating. Other potential application where the embedded circuit can be utilized simultaneously is for sensing temperature inside the tool based on changes in resistance of the circuit.

Additionally, a novel system for laying down HC called AWDS was developed. The AWDS' rotating platform allows introducing heating circuits in the two following manners. First, AWDS can deposit HC simultaneously with the printing process following the printing trajectory. Second, AWDS can lay down HC on a layer-by-layer basis without extruding material, thereby enabling wire orientations that are different from the printing path and HC with varying densities.

Heating circuits embedded during the tool printing process, as described in this disclosure, offer a unique flexibility to design heating zones in a tool, which is not readily achieved with traditional technologies. Further, temperature gradients introduced with traditional heating elements are significantly reduced using heating circuits near the tooling surface. This is of particular interest for processing composites since a uniform temperature at the tooling surface is required to properly cure the part manufactured with a printed mold. Unlike traditional techniques used to heat tools, the use of heating circuits in 3D printed tools enables heating a tool surface up to 180° C. without locally melting the printed material. Using heating circuits near the surface of the tool can potentially reduce the energy used for heating the tool. The test carried out to prove this technology uses a heating circuit embedded between two layers.

While the above description mainly dealt with a mold, as mentioned before, the principles and concepts and methods apparatus of this disclosure apply to any article manufactured by additive manufacturing methods and techniques. Accordingly, based on the above detailed description, it is an objective of this disclosure to describe a method of embedding a heated circuit in an article fabricated by additive manufacturing. The method includes co-extruding a wire along with print material utilized in additive manufacturing of the article, wherein the wire is capable of being heated when the article is used in an intended application. The print material is a polymer or a polymer composite where the polymer composite comprise a polymer resin reinforced with fibers or particles with different shapes. A non-limiting example of a polymer composite suitable for this purpose includes s Polyphenylene sulfide and carbon fiber. In one embodiment of the method employing this polymer composite, Polyphenylene and carbon fiber are in equal proportion by weight. In one embodiment of the method, the wire is capable of heated by joule heating or induction heating. The wire can be made of a metallic material such as metal or alloy. A non-limiting example of an alloy suitable for making the wire contains nickel and chromium.

It is also an objective of this disclosure to describe another method of embedding a heating circuit in an article fabricated by additive manufacturing. This includes placing a pre-shaped wire between at least two adjacent layers printed with additive manufacturing material utilized in additive manufacturing of the article, wherein the pre-shaped wire is capable of being heated when the article is used in an intended application. The print material in this method can be a polymer or a polymer composite. In one embodiment of the method, the polymer composite comprises Polyphenylene sulfide and carbon in equal proportion by weight. In one embodiment of the method, the wire is capable of heated by joule heating or induction heating. The wire in this method can be made of a metal or an alloy such as, but not limited to a nickel-chromium alloy.

It is yet another objective of this disclosure to describe yet another method of embedding a heating circuit in an article fabricated by additive manufacturing. The method includes the steps of dispensing a wire in a predefined fashion during the additive manufacturing into material printed to make an article, wherein the wire is capable of being heated when the article is used in an intended application; heating the wire while being dispensed; compacting the wire into the printed material; and cutting the wire to a desired length. A print material suitable for this method is a polymer or a polymer composite. Examples of polymer composites that can be used in this method include, but not limited to, a polymer composite containing Polyphenylene and carbon fiber in equal proportion by weight. The wire in this method can be heated by joule heating or induction heating. The wire in this method can be made of a metal or an alloy such as, but not limited to a nickel-chromium alloy. It will be recognized by those skilled in the art that this method can be modified to print just the article without the wire or just the wire or both.

It is also an objective of this disclosure to describe an apparatus for embedding a heating circuit in an article fabricated by additive manufacturing. The apparatus includes a wire dispenser capable of dispensing a wire in a predefined fashion during the additive manufacturing into material printed to make an article, the wire being capable of being heated; a heating system capable of heating the wire while being dispensed; a cutter capable of cutting the wire to a desired length; and a compactor capable of compacting the wire into the printed material. In this apparatus, the print material can be a polymer or a polymer composite. An example of a wire dispenser is a combination of a wire spool and sets of rollers with required mechanisms known to those skilled in the art, as shown in FIGS. 18 and 19. An example of a heating system includes applying a voltage across the first set of rollers 1850 and the second set of rollers 1860 so that current flows thorough the wire thereby heating the wire through Joule effect. Examples of compactors suitable for the apparatus of this disclosure include but not limited to rollers, tampers, and ultrasonic vibrators. Cutters suitable for the apparatus of this disclosure include, but not limited to shear cutters. A non-limiting example of a suitable polymer contains Polyphenylene sulfide and carbon fiber in equal proportion by weight. In one embodiment of the apparatus, the wire is capable of being heated by joule heating or induction heating. Materials suitable for the wire include metals and alloys. A non-limiting example of an alloy suitable for making the wire is a nickel-chromium alloy. It should be noted that the apparatus of this disclosure can be used to print a wire along with printing material or deposit wire on a previously printed surface to make the mold.

It is yet another objective of this disclosure to describe an article made by additive manufacturing, which contains one or more heating elements embedded in the article during the additive manufacturing process. In one embodiment of the articles of this disclosure, the heating element is a wire. Suitable materials for making the wire of this article include metals and alloys. A non-limiting example of an alloy suitable for a wire of this article is a nickel-chromium alloy. It should be noted that shape of heating elements in the methods of this disclosure is not to be limited to a wire but can include other shapes such as, but not limited to, ribbons. In another embodiment of the articles of this disclosure, the heating element can be a carbon fiber strand. In some embodiments the articles of this disclosure, the heating element can be a heating circuit.

Non-limiting examples of such articles which can contain one or more heating elements embedded in the article by the methods and apparatus of this disclosure include molds. Examples of processes that can use such molds with embedded heating elements include but not limited to injection molding, compression molding, hot stamping molding, resin transfer molding and high pressure resin transfer molding. Accordingly, non-limiting examples of molds made by the methods and apparatus of this disclosure containing heating circuits or elements include injection mold, compression mold, hot stamping mold, resin transfer mold and high pressure resin transfer mold.

While several embodiments of the methods, apparatus and articles described above include a wire capable of being heated, a carbon fiber strand can be used in place of the wire, as a carbon fiber strand is also capable of being heated.

It should be noted that in the methods, apparatus and articles of this disclosure, a heating element is embedded in an article. In many situations, the heating element selected can undergo significant resistance change with temperature. In such cases, the resistance change can be exploited such that the heating element can also function as a temperature sensor for the regions in the article. Thus, it is another objective of this disclosure to disclose an article, which contains a temperature sensor embedded in the mold during the fabrication of the article through additive manufacturing.

While the present disclosure has been described with reference to certain embodiments, it will be apparent to those of ordinary skill in the art that other embodiments and implementations are possible that are within the scope of the present disclosure without departing from the spirit and scope of the present disclosure. Thus, the implementations should not be limited to the particular limitations described. Other implementations may be possible. It is therefore intended that the foregoing detailed description be regarded as illustrative rather than limiting. Thus, this disclosure is limited only by the following claims.

The invention claimed is:

1. A method of embedding a heating circuit in an article fabricated by additive manufacturing, the method comprising introducing a wire into the article fabricated by additive manufacturing along with print material utilized in additive manufacturing of the article, wherein the wire is capable of being heated when the article is used in an intended application, wherein the article has a layered structure comprising a material with anisotropic thermal conductivity, and wherein the wire is introduced into a layer of the layered structure, wherein the layer of the layered structure is chosen such that heating path of the wire when heated is based on the local orientation of the material with anisotropic thermal conductivity and geometry of the article with respect to temperature gradients.

2. The method of claim 1, wherein the introducing of the wire is achieved by co-extruding the wire along with the print material.

3. The method of claim 2, wherein the print material is a polymer or a polymer composite.

4. The method of claim 3, wherein the polymer composite comprises fibers and a polymer resin.

5. The method of claim 2, wherein the wire is capable of heated by joule heating or induction heating.

6. The method of claim 2, wherein the wire is composed of a carbon fiber strand.

7. The method of claim 1, where in the introducing of the wire comprises the steps of:
dispensing the wire in a predefined fashion during the additive manufacturing into material printed to make the article, wherein the wire is capable of being heated when the article is used in an intended application;
heating the wire while being dispensed;
compacting the wire into the printed material; and
cutting the wire to a desired length.

8. The method of claim 7, wherein the print material is a polymer or a polymer composite.

9. The method of claim 8, wherein the polymer composite comprises fibers and a polymer resin.

10. The method of claim 7, wherein the wire is capable of heated by joule heating or induction heating.

* * * * *